US007983674B2

(12) United States Patent
Julian et al.

(10) Patent No.: US 7,983,674 B2
(45) Date of Patent: Jul. 19, 2011

(54) SERVING BASE STATION SELECTION IN A WIRELESS COMMUNICATION SYSTEM

(75) Inventors: David Jonathan Julian, San Diego, CA (US); Avneesh Agrawal, San Diego, CA (US); Edward Harrison Teague, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1297 days.

(21) Appl. No.: 11/453,438

(22) Filed: Jun. 14, 2006

(65) Prior Publication Data

US 2006/0286996 A1 Dec. 21, 2006

Related U.S. Application Data

(60) Provisional application No. 60/691,435, filed on Jun. 16, 2005, provisional application No. 60/793,115, filed on Apr. 18, 2006.

(51) Int. Cl.
*H04W 36/00* (2009.01)
(52) U.S. Cl. ........................................ 455/436; 370/331
(58) Field of Classification Search .......... 455/436–444, 455/522; 370/318, 331
See application file for complete search history.

(56) References Cited

U.S. PATENT DOCUMENTS

| | | | |
|---|---|---|---|
| 5,390,366 A * | 2/1995 | Kasugai | ........................ 455/524 |
| 6,134,200 A | 10/2000 | Timmermans | |
| 6,628,631 B1 | 9/2003 | Mazawa et al. | |
| 6,633,554 B1 | 10/2003 | Dalal | |
| 6,636,735 B2 * | 10/2003 | Mohebbi | ........................ 455/437 |
| 6,725,043 B2 | 4/2004 | Bonta et al. | |
| 6,757,270 B1 | 6/2004 | Kumar et al. | |
| 6,859,444 B1 * | 2/2005 | Vancraeynest | ................ 370/331 |
| 6,973,308 B1 | 12/2005 | Smith | |
| 6,993,341 B2 | 1/2006 | Hunzinger | |
| 7,054,632 B2 | 5/2006 | Attar et al. | |

(Continued)

FOREIGN PATENT DOCUMENTS

CN        1272756        11/2000

(Continued)

OTHER PUBLICATIONS

Group-orthogonal multicarrier CDMA Xiaodong Cai; Shengli Zhou; Giannakis, G.B.; Communications, IEEE Transactions on vol. 52, Issue 1, Jan. 2004 pp. 90-99.*

(Continued)

*Primary Examiner* — Raymond S Dean
(74) *Attorney, Agent, or Firm* — Dmitry R. Milikovsky; Darren M. Simon

(57) ABSTRACT

Techniques for selecting a reverse link (RL) serving base station for a terminal are described. The terminal sends a transmission on the reverse link to multiple base stations in a wireless communication system. The transmission may be for signaling sent on a control channel. The terminal receives feedback (e.g., power control (PC) commands and/or erasure indications) from the multiple base stations. Each base station may generate feedback based on the control channel and/or some other transmission received from the terminal. The terminal performs reverse link power control and further selects an RL serving base station based on the received feedback. For example, the terminal may select the base station with the lowest transmit power level, the largest percentage of power down commands, or the lowest erasure rate as the RL serving base station.

36 Claims, 13 Drawing Sheets

U.S. PATENT DOCUMENTS

| | | | |
|---|---|---|---|
| 7,133,688 B2 * | 11/2006 | Das et al. | 455/522 |
| 7,190,964 B2 * | 3/2007 | Damnjanovic et al. | 455/522 |
| 7,684,778 B1 | 3/2010 | Qian et al. | |
| 2002/0085517 A1 | 7/2002 | Lee et al. | |
| 2002/0094834 A1 * | 7/2002 | Baker et al. | 455/522 |
| 2002/0138721 A1 | 9/2002 | Kwon et al. | |
| 2002/0196752 A1 | 12/2002 | Attar et al. | |
| 2003/0017831 A1 | 1/2003 | Lee et al. | |
| 2003/0064741 A1 | 4/2003 | Silva et al. | |
| 2003/0073455 A1 * | 4/2003 | Hashem et al. | 455/525 |
| 2003/0076796 A1 | 4/2003 | Kondo | |
| 2003/0086393 A1 | 5/2003 | Vasudevan et al. | |
| 2003/0119511 A1 | 6/2003 | Shin | |
| 2004/0037291 A1 | 2/2004 | Attar et al. | |
| 2004/0114552 A1 | 6/2004 | Lim et al. | |
| 2004/0158790 A1 * | 8/2004 | Gaal et al. | 714/748 |
| 2004/0235425 A1 * | 11/2004 | Tayloe et al. | 455/69 |
| 2005/0073975 A1 | 4/2005 | Chen et al. | |
| 2006/0135173 A1 | 6/2006 | Vannithamby | |
| 2006/0187883 A1 * | 8/2006 | Abrol et al. | 370/331 |
| 2007/0155388 A1 * | 7/2007 | Petrovic et al. | 455/442 |
| 2007/0173256 A1 * | 7/2007 | Laroia et al. | 455/436 |
| 2007/0201407 A1 * | 8/2007 | Borran et al. | 370/335 |
| 2010/0111152 A1 | 5/2010 | Bhushan et al. | |

FOREIGN PATENT DOCUMENTS

| | | |
|---|---|---|
| EP | 0902551 A2 | 3/1999 |
| EP | 1049349 | 11/2000 |
| EP | 1059736 | 12/2000 |
| EP | 1432261 A1 | 6/2004 |
| EP | 1507422 | 2/2005 |
| JP | 9312869 | 12/1997 |
| JP | 2000350248 | 12/2000 |
| JP | 2001036942 | 2/2001 |
| JP | 2001145147 | 5/2001 |
| JP | 2002305767 | 10/2002 |
| JP | 2004515932 | 5/2004 |
| JP | 2004519122 | 6/2004 |
| JP | 2004531124 | 10/2004 |
| JP | 2005006116 | 1/2005 |
| JP | 2005508588 | 3/2005 |
| JP | 2005517343 | 6/2005 |
| JP | 2006517761 | 7/2006 |
| JP | 2007502559 | 2/2007 |
| KR | 1020050084908 | 8/2005 |
| RU | 2143177 C1 | 12/1999 |
| RU | 2073913 | 3/2009 |
| WO | WO9205556 | 4/1992 |
| WO | WO9747154 | 12/1992 |
| WO | WO9944313 | 9/1999 |
| WO | WO0133871 | 5/2001 |
| WO | WO0189162 | 11/2001 |
| WO | WO02078371 | 10/2002 |
| WO | 03003784 | 1/2003 |
| WO | WO03044970 A2 | 5/2003 |
| WO | WO03067783 | 8/2003 |
| WO | WO03090488 A1 | 10/2003 |
| WO | WO2004060011 | 7/2004 |
| WO | WO2004064294 | 7/2004 |
| WO | WO2004064304 | 7/2004 |
| WO | WO2004100569 | 11/2004 |
| WO | 2005018114 | 2/2005 |
| WO | WO2005018256 | 2/2005 |
| WO | WO2005041515 | 5/2005 |
| WO | 2005125253 | 12/2005 |
| WO | 2006069296 | 6/2006 |

OTHER PUBLICATIONS

International Search Report—PCT/US2006/023502, International Search Authority—European Patent Office—Dec. 20, 2006.

International Preliminary Examination Report—PCT/US2006/023502, International Search Authority—The International Bureau of WIPO—Dec. 17, 2007.

Written Opinion—PCT/US2006/023502, International Search Authority—European Patent Office—Dec. 16, 2007.

Beek, et al., "A Time and Frequency Synchronization Scheme for Multiuser OFDM," IEEE Journal on Selected Areas in Communication, 1999, 17 (11), 1900-1914.

Bottomley, et al., "A Generalized Rake Receiver for Interference Suppression," IEEE Journal on Selected Areas in Communication, 2000, 18 (18), 1536-1544.

Ebeling, et al., "Implementing an OFDM Receiver on the RaPiD Reconfigurable Architecture," IEEE Transactions on Computer, 2004, 53 (11), 1436-1447.

Nasipuri et al., "A MAC Protocol for Mobile Ad Hoc Network Using Directional Antennas," IEEE Wireless Communications and Networking Conference, 2000, 3, 1214-1219.

Parsaee, et al., "OFDMA for the 4th Generation Cellular Networks," IEEE Canadian Conference on Electrical and Computer Engineering, 2004, 2004, 2325-2330.

Hwank, "A tendency of 23 GHz wireless super-high speed internet technology," Data presented by HANARO Telecom, Inc., 2003.

* cited by examiner

SERVING BASE STATION SELECTION IN A WIRELESS COMMUNICATION SYSTEM

CLAIM OF PRIORITY UNDER 35 U.S.C. §119

The present application claims priority to provisional U.S. Application Ser. No. 60/691,435, entitled "OFDMA RELATIVE CHANNEL SELECTION FOR HANDOFF," filed Jun. 16, 2005, and Application Ser. No. 60/793,115, entitled "SERVING BASE STATION SELECTION IN A WIRELESS COMMUNICATION SYSTEM," filed Apr. 18, 2006, both assigned to the assignee hereof and incorporated herein by reference.

BACKGROUND

I. Field

The present disclosure relates generally to communication, and more specifically to techniques for selecting a serving base station.

II. Background

Wireless communication systems are widely deployed to provide various communication services such as voice, video, packet data, broadcast, messaging, and so on. These systems may be multiple-access systems capable of supporting communication for multiple terminals by sharing the available system resources. Examples of such multiple-access systems include Code Division Multiple Access (CDMA) systems, Time Division Multiple Access (TDMA) systems, Frequency Division Multiple Access (FDMA) systems, and Orthogonal Frequency Division Multiple Access (OFDMA) systems.

A multiple-access system typically utilizes a multiplexing scheme to support transmissions for multiple terminals on each of the forward and reverse links. The forward link (or downlink) refers to the communication link from the base stations to the terminals, and the reverse link (or uplink) refers to the communication link from the terminals to the base stations. On the reverse link, a transmission from a terminal may be received by one or more base stations. Each base station may observe different channel conditions for the terminal and may thus receive the transmission with different received signal quality. Improved performance as well as better utilization of the available system resources may be achieved by selecting an appropriate base station to serve the terminal on the reverse link.

There is therefore a need in the art for techniques to select a serving base station for a terminal in a wireless communication system.

SUMMARY

Techniques for selecting a serving base station for a terminal for the reverse link are described herein. In an embodiment, the terminal sends a transmission on the reverse link to multiple base stations in a wireless communication system. The transmission may be for signaling sent on a control channel. The terminal receives feedback (e.g., power control (PC) commands and/or erasure indications) from the multiple base stations. Each base station may generate feedback based on the control channel and/or some other transmission received from the terminal. The terminal performs reverse link power control of the control channel based on the received feedback.

The terminal further selects a reverse link (RL) serving base station based on the received feedback. In one embodiment, the terminal determines the transmit power level for each base station based on PC commands received from that base station and selects the base station with the lowest transmit power level as the RL serving base station. In another embodiment, the terminal determines the percentage of power down commands for each base station and selects the base station with the largest percentage of power down commands as the RL serving base station. In yet another embodiment, the terminal selects the RL serving base station based on a combination of transmit power levels and percentages of power down commands for the base stations. In yet another embodiment, the terminal determines an erasure rate for each base station based on erasure indications received from that base station and selects the base station with the lowest erasure rate as the RL serving base station. The RL serving base station is designated to serve the terminal on the reverse link.

The terminal may have one candidate set of base stations selectable to serve it on the reverse link. The terminal may have another candidate set of base stations selectable to serve it on the forward link. The two candidate sets may be independent or "disjoint", and base stations may be added to and removed from each candidate set independent of the other candidate set.

Various aspects and embodiments of the invention are described in further detail below.

BRIEF DESCRIPTION OF THE DRAWINGS

The features and nature of the present invention will become more apparent from the detailed description set forth below when taken in conjunction with the drawings in which like reference characters identify correspondingly throughout.

DETAILED DESCRIPTION

The word "exemplary" is used herein to mean "serving as an example, instance, or illustration." Any embodiment or design described herein as "exemplary" is not necessarily to be construed as preferred or advantageous over other embodiments or designs.

Figure 1:
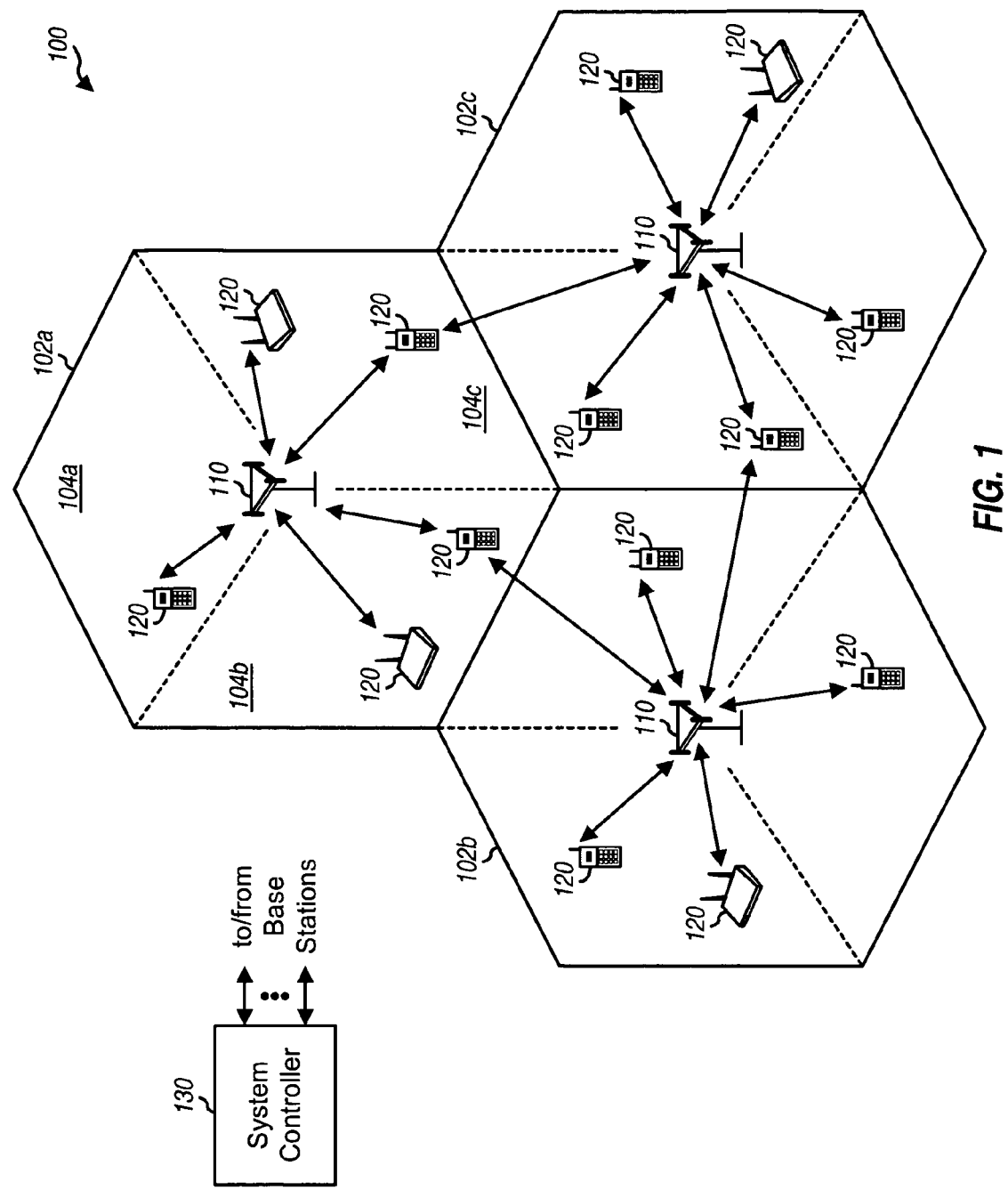
FIG. 1 shows a wireless multiple-access communication system.

FIG. 1 shows a wireless multiple-access communication system 100 with multiple base stations 110 and multiple terminals 120. A base station is a station that communicates with the terminals. A base station may also be called, and may contain some or all of the functionality of, an access point, a Node B, and/or some other network entity. Each base station 110 provides communication coverage for a particular geographic area 102. The term "cell" can refer to a base station and/or its coverage area depending on the context in which the term is used. To improve system capacity, a base station coverage area may be partitioned into multiple smaller areas, e.g., three smaller areas 104a, 104b, and 104c. Each smaller area may be served by a respective base transceiver subsystem (BTS). The term "sector" can refer to a BTS and/or its coverage area depending on the context in which the term is used. For a sectorized cell, the BTSs for all sectors of that cell are typically co-located within the base station for the cell.

For a centralized architecture, a system controller 130 couples to base stations 110 and provides coordination and control for these base stations. System controller 130 may be a single network entity or a collection of network entities. For a distributed architecture, the base stations may communicate with one another as needed.

Terminals 120 may be dispersed throughout the system, and each terminal may be fixed or mobile. A terminal may also be called, and may contain some or all of the functionality of, an access terminal, a mobile station, a user equipment, a subscriber station, and/or some other entity. A terminal may be a wireless device, a cellular phone, a personal digital assistant (PDA), a wireless modem, a handheld device, and so on.

As shown in FIG. 1, each terminal 120 may be located anywhere within a cell or sector and may be at different distances to nearby base stations. Each terminal 120 may thus observe different channel conditions for different base stations 110. Similarly, each base station 110 may observe different channel conditions for different terminals within its coverage area. In general, the channel conditions between a terminal and a base station for each link may be affected by various factors such as the distance between the terminal and the base station, environmental conditions, and so on.

In a time division duplexed (TDD) system, e.g., a Global System for Mobile Communications (GSM) system, the forward and reverse links share a common frequency band, and the channel conditions for the forward link may correlate well with the channel conditions for the reverse link. In this case, the channel quality for one link (e.g., the reverse link) may be estimated based on channel quality measurements for the other link (e.g., the forward link). Each terminal may then be served by a single base station for both the forward and reverse links in the TDD system.

In a frequency division duplexed (FDD) system, the forward and reverse links are allocated different frequency bands, and the channel conditions for the forward link may not correlate well with the channel conditions for the reverse link. In this case, the channel quality for each link may be estimated based on channel quality measurements for that link. To achieve good performance, each terminal may be served (1) on the reverse link by a base station that observes the best channel quality for the terminal and (2) on the forward link by a base station from which the terminal observes the best channel quality. The best serving base station for the reverse link may be the same as or different from the best serving base station for the forward link in the FDD system.

Each base station typically transmits a pilot on the forward link. The pilot is a known transmission that may be used by the terminals for various purposes such as signal detection, channel estimation, time synchronization, frequency correction, and so on. A terminal may estimate the FL channel quality for each base station based on the pilot received from that base station. The terminal may then select a serving base station for the forward link based on the FL channel quality estimates for all base stations received by the terminal.

To reduce overhead, each terminal typically does not transmit a pilot on the reverse link, unless the terminal is also transmitting data and/or signaling. Hence, the base stations may not be able to estimate the RL channel quality for each terminal based on a pilot from that terminal. Other mechanisms may then be used to estimate the RL channel quality for a terminal, as described below.

In an embodiment, a terminal may receive a data transmission from a base station on the forward link, which is called an FL serving base station, and may send a data transmission to a base station on the reverse link, which is called an RL serving base station. The FL serving base station may or may not be the RL serving base station. In an embodiment, separate candidate sets are maintained for the terminal for the forward and reverse links. The candidate sets may also be referred to as active sets or some other terminology. The candidate set for each link contains the serving base station for that link as well as candidate base stations to which the terminal may be handed off. Base stations may be added to or removed from each candidate set based on signal quality measurements, which may be made by the terminal and/or the base stations. Much of the following description is for selecting an RL serving base station from the RL candidate set.

In an embodiment, a terminal is assigned a dedicated control channel on the reverse link by each base station in the RL candidate set. The dedicated control channel may be used to send various types of signaling such as, e.g., channel quality indication (CQI) reports, power control (PC) commands, acknowledgements (ACKs) and/or negative acknowledgements (NAKs) for packets received on the forward link, request for resources on the reverse link, and so on. In another embodiment, a terminal is assigned a common control channel on the reverse link for all base stations in the RL candidate set. In this embodiment, the terminal may multiplex signaling for all base stations onto the common control channel that may be received by all base stations in the RL candidate set. The control channel(s) may be sent in various manners depending on the system design, e.g., with OFDMA, CDMA, TDMA and/or FDMA. The control channel(s) may be sent using the same multiple-access scheme (e.g., OFDMA) as the traffic channel(s) or may be sent using a different multiple-access scheme than the traffic channel(s). For example, the control channel(s) may be sent using CDMA and the traffic channel(s) may be sent using OFDMA. A dedicated control channel for each base station may be sent using a different pseudo-random number (PN) sequence, a different frequency hopping pattern, a different set of subcarriers or time slots, and so on. In any case, each base station in the RL candidate set may be able to estimate the RL channel quality for the terminal based on the control channel received from the terminal.

Figure 2:
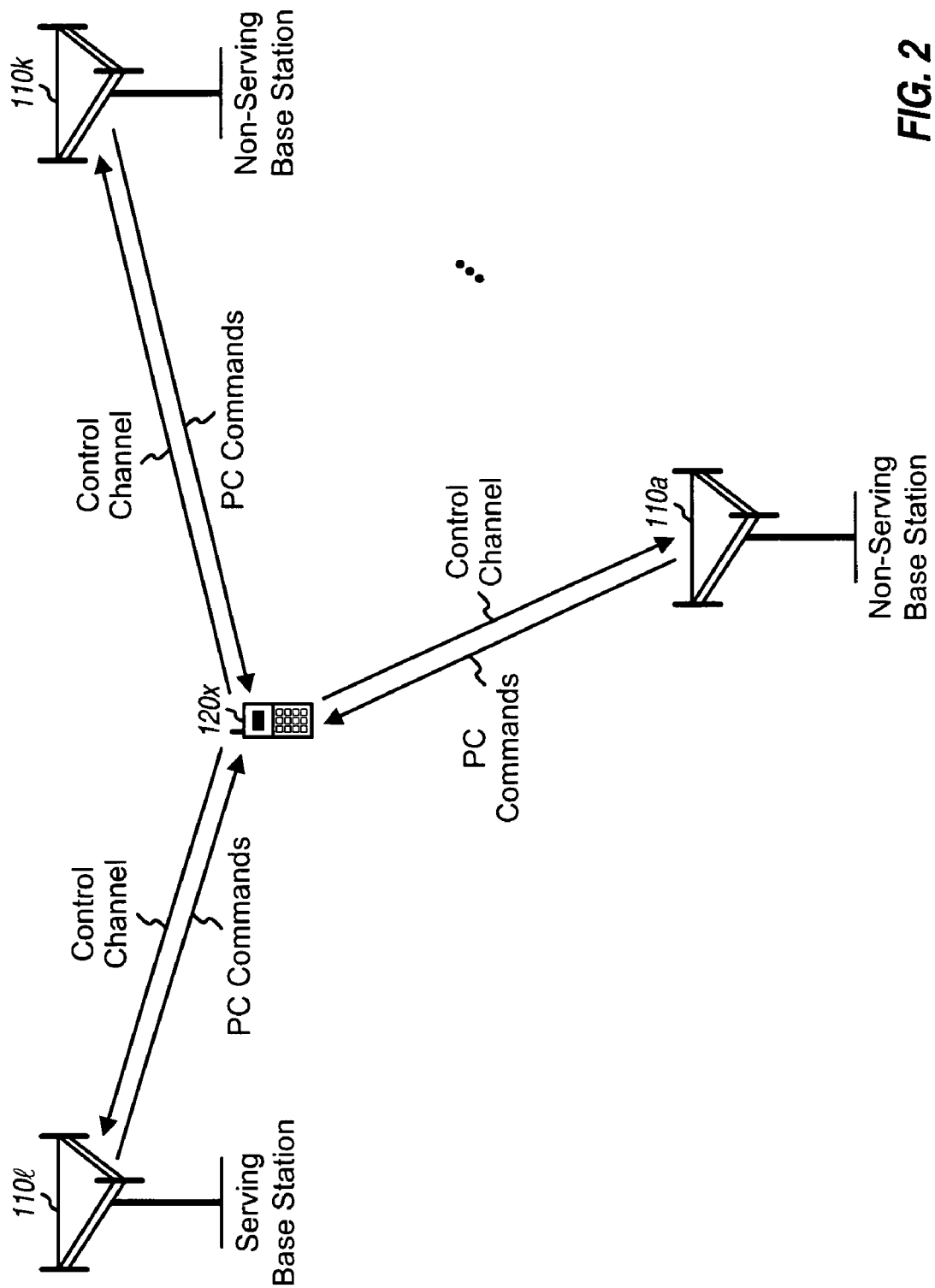
FIG. 2 shows a terminal communicating with multiple base stations.

FIG. 2 shows an embodiment of a terminal 120x communicating with multiple base stations 110a through 110l. Terminal 120x may transmit (1) a dedicated control channel to each of base stations 110a through 110l in the RL candidate set, (2) a common control channel to all of the base stations, or (3) a combination of dedicated and common control channels, e.g., a dedicated control channel to serving base station 110l and a common control channel to non-serving base stations 110a through 110k. Each base station 110 may estimate the RL channel quality for terminal 120x based on the control channel received from terminal 120x. In an embodiment, closed-loop power control is performed for the control channel(s). For closed-loop power control, each base station 110 estimates the signal quality of the control channel received from terminal 120x and generates PC commands to direct terminal 120x to adjust the transmit power of the control channel. Each PC command may be either (1) a power up (or UP) command to direct an increase in transmit power or (2) a power down (or DOWN) command to direct a decrease in transmit power. Each base station 110 sends the PC commands to terminal 120x. Terminal 120x adjusts the transmit power of the control channel(s) based on the received PC commands, as described below. Terminal 120x may also ascertain the RL channel quality observed by each base station 110 for terminal 120x based on the received PC commands, as also described below.

Figure 3:
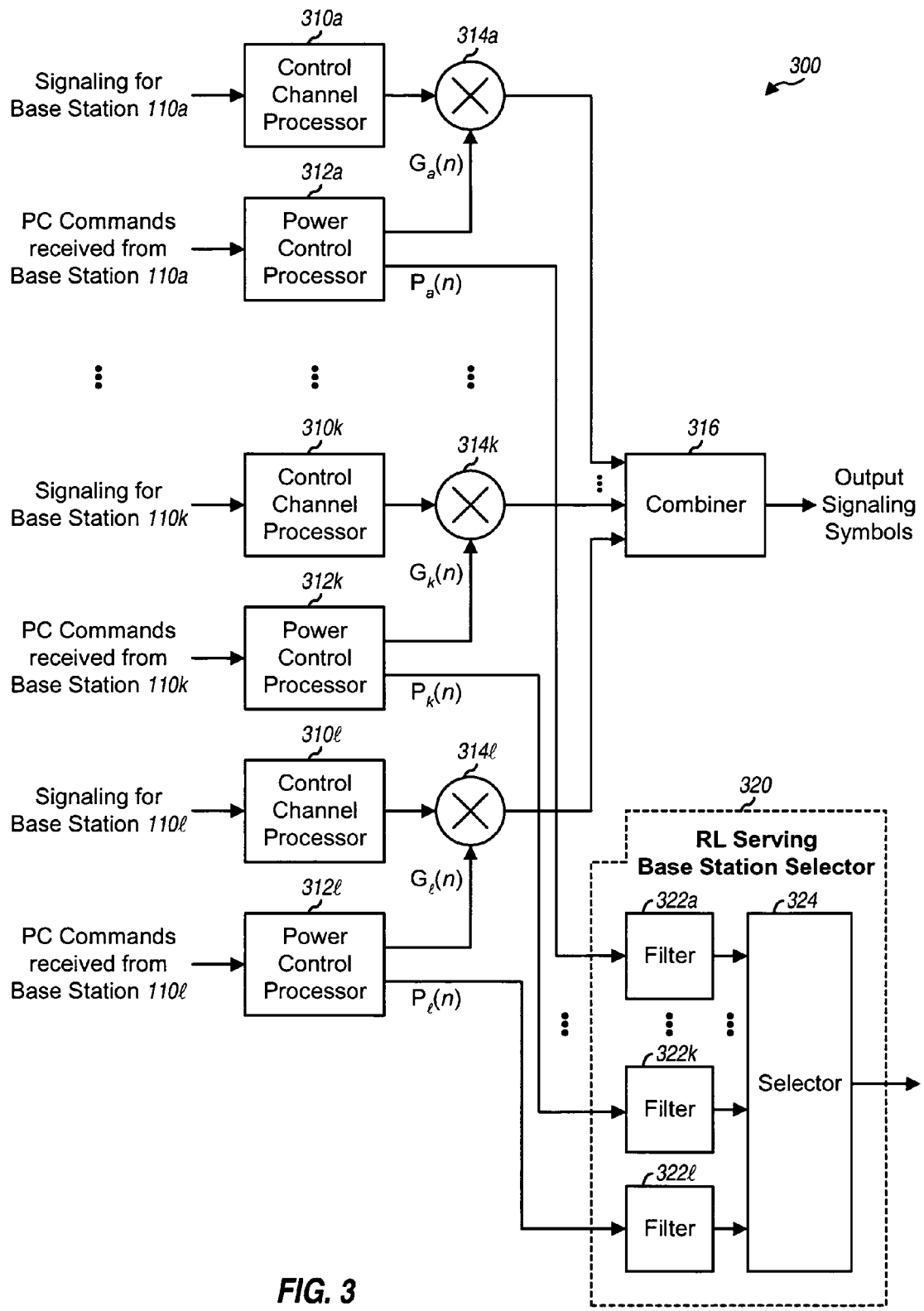
FIG. 3 shows an apparatus that independently adjusts transmit power for different base stations and ascertains RL channel qualities based on PC commands.

FIG. 3 shows an embodiment of an apparatus 300 for independently adjusting transmit power of dedicated control channels and ascertaining RL channel qualities observed by different base stations for terminal 120x based on PC commands received from the base stations. In this embodiment, terminal 120x sends separate control channels to the base stations in the RL candidate set and independently adjusts the transmit power of the control channel sent to each base station based on PC commands received from that base station. The base stations may generate PC commands such that the control channels achieve similar performance at the base stations. Performance may be quantified by a target signal-to-noise ratio (SNR), a target signal-to-noise-and-interference ratio (SINR), a target carrier-to-interference ratio (C/I), a target energy-per-symbol-to-noise ratio (Es/No), a target erasure rate, a target block error rate, and/or some other measure. For clarity, the following description assumes that performance is quantified by a target C/I.

In the embodiment shown in FIG. 3, signaling for base stations 110a through 110l is provided to control channel processors 310a through 310l, respectively. Each control channel processor 310 processes (e.g., encodes and symbol maps) its signaling and provides signaling symbols. PC commands received from base stations 110a through 110l are provided to power control processors 312a through 312l, respectively. Each power control processor 312 makes a decision on each received PC command. A PC decision may be either an UP decision if a received PC command is deemed to be an UP command or a DOWN decision if the received PC command is deemed to be a DOWN command. Each power control processor 312 may adjust the transmit power of an associated control channel based on the PC decisions, as follows:

$$P_i(n) = \begin{cases} P_i(n-1) + \Delta P_{UP} & \text{for an UP decision,} \\ P_i(n-1) - \Delta P_{DN} & \text{for a DOWN decision,} \end{cases} \text{ for } i \in \{a, \ldots, l\}, \quad \text{Eq (1)}$$

where
$\Delta P_{UP}$ is an UP step size for the transmit power of the control channel,
$\Delta P_{DN}$ is a DOWN step size for the transmit power of the control channel, and
$P_i(n)$ is the transmit power of the control channel for base station i in update interval n.

The transmit power $P_i(n)$ and the step sizes $\Delta P_{UP}$ and $\Delta P_{DN}$ are given in units of decibels (dB).

Each power control processor 312 may compute a transmit power gain for the associated control channel, as follows:

$$G_i(n) = 10^{P_i(n)/20}, \quad \text{Eq (2)}$$

where $G_i(n)$ is the transmit power gain of the control channel for base station i in update interval n. The transmit power gain $G_i(n)$ is given in linear unit.

Multipliers 314a through 314l receive and multiply the signaling symbols from control channel processors 310a through 310l, respectively, with the transmit power gains $G_a(n)$ through $G_l(n)$ from power control processors 312a through 312l, respectively, and provide scaled signaling symbols for base stations 110a through 110l, respectively. A combiner 316 combines (e.g., sums or multiplexes) the scaled signaling symbols from multipliers 314a through 314l and provides output signaling symbols for all base stations in the RL candidate set.

In the embodiment shown in FIG. 3, an RL serving base station selector 320 includes filters 322a through 322l for base stations 110a through 110l, respectively, and a selector 324. Filters 322a through 322l receive and filter transmit power levels $P_a(n)$ through $P_l(n)$, respectively, and provide filtered transmit power levels for base stations 110a through 110l, respectively. Each filter 322 may perform a sliding/running average over a particular time window (e.g., with a FIR filter), filtering in some other manner (e.g., with an IIR filter), some other linear or nonlinear signal processing, or no processing at all (in which case the filtered transmit power levels are equal to the unfiltered transmit power levels). Selector 324 receives the filtered transmit power levels for the control channels for base stations 110a through 110l and selects the base station with the lowest filtered transmit power level as the RL serving base station.

As an example, terminal 120x may have an RL candidate set with two base stations 1 and 2. Terminal 120x may send control channel 1 to base station 1 and control channel 2 to base station 2. The PC commands from base station 1 may adjust the transmit power of control channel 1 to achieve the target C/I. Similarly, the PC commands from base station 2 may adjust the transmit power of control channel 2 to achieve the same target C/I. Terminal 120x compares the filtered transmit power level for control channel 1 against the filtered transmit power level for control channel 2 to determine the relative performance of the control channels. If the filtered transmit power level for control channel 1 is less than the filtered transmit power level for control channel 2, then control channel 1 observes better channel conditions than control channel 2 and hence requires less transmit power to achieve the target C/I. Terminal 120x may then select base station 1 as the RL serving base station and may convey this selection to the current RL serving base station, the new RL serving base station, or all base stations in the RL candidate set.

Figure 4:
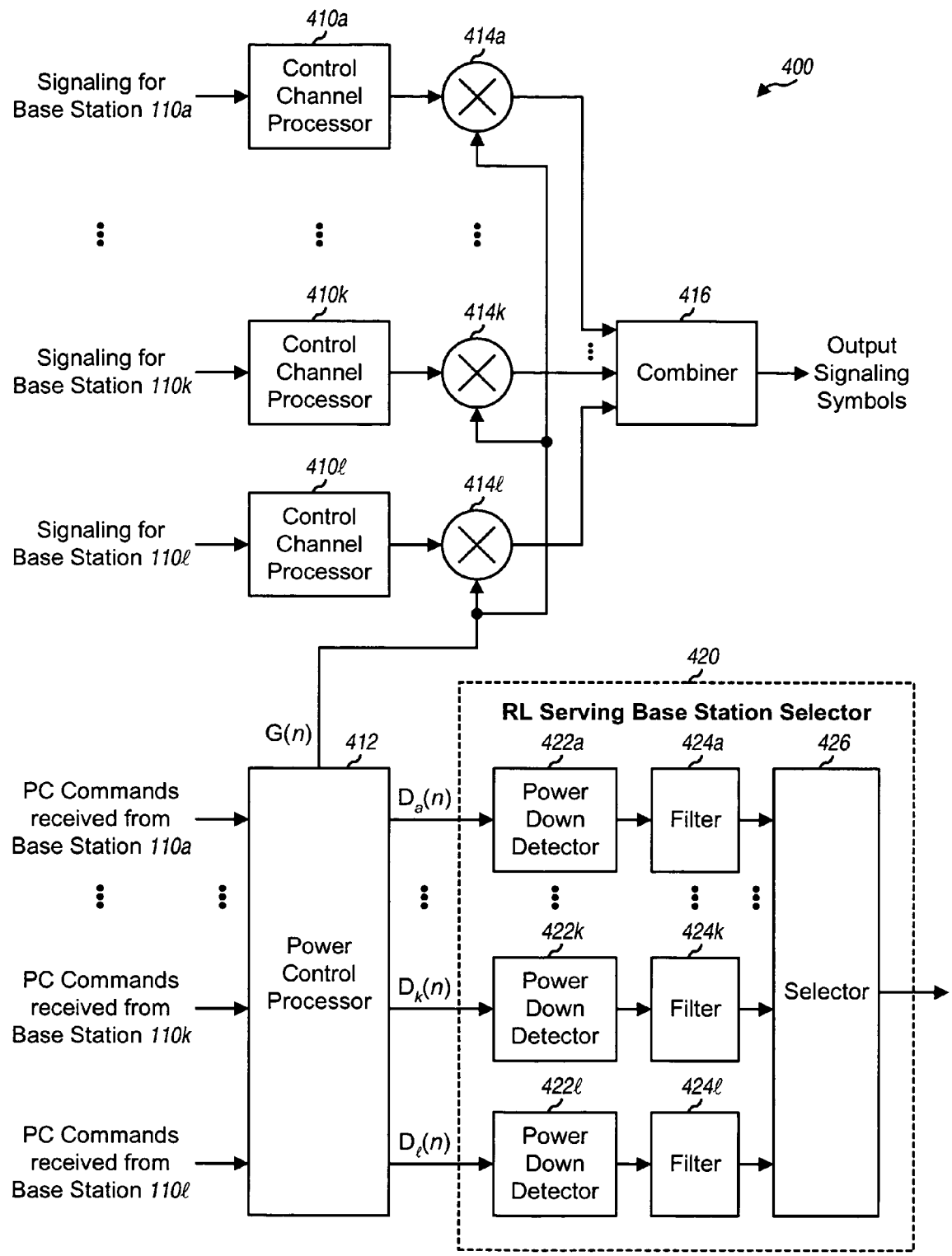
FIG. 4 shows an apparatus that jointly adjusts transmit power for all base stations and ascertains RL channel qualities based on PC commands.

FIG. 4 shows an embodiment of an apparatus 400 for jointly adjusting transmit power of all dedicated control channels and ascertaining RL channel quality observed by different base stations for terminal 120x based on PC commands received from the base stations. In this embodiment, terminal 120x sends separate control channels to the base stations in the RL candidate set but uses the same transmit power level for all of the control channels. Terminal 120x adjusts this transmit power level based on PC commands received from all base stations in the RL candidate set such that the target C/I is achieved at the best base station in the RL candidate set.

In the embodiment shown in FIG. 4, control channel processors 410a through 410l process signaling for base stations 110a through 110l, respectively, and provide signaling symbols. A power control processor 412 receives PC commands from base stations 110a through 110l, makes a decision on each received PC command, and adjusts a common transmit power level P(n) for all control channels based on the PC decisions for all base stations. Power control processor 412 may apply an OR-of-the-DOWN rule on the PC decisions in each update interval, as follows:

$$P(n) = \begin{cases} P(n-1) + \Delta P_{UP} & \text{if UP decisions are obtained for all base stations,} \\ P(n-1) - \Delta P_{DN} & \text{if a DOWN decision is obtained for any base station.} \end{cases} \quad \text{Eq (3)}$$

Power control processor 412 may compute the transmit power gain G(n) for the control channels as $G(n)=10^{P(n)/20}$. Since the control channels are sent to base stations that could potentially serve terminal 120x on the reverse link, the OR-of-the-DOWN rule may allow terminal 120x to transmit at a lower power level determined by the best base station in the RL candidate set. This may provide a link budget gain and allow more of the available transmit power to be used for data transmission.

Multipliers 414a through 414l receive and multiply the signaling symbols from control channel processors 410a through 410l, respectively, with the transmit power gain G(n) from power control processor 412 and provide scaled signaling symbols for base stations 110a through 110l, respectively. A combiner 416 combines the scaled signaling symbols from multipliers 414a through 414l and provides output signaling symbols for all base stations in the RL candidate set.

In the embodiment shown in FIG. 4, an RL serving base station selector 420 includes power down detectors 422a through 422l and filters 424a through 424l for base stations 110a through 110l, respectively, and a selector 426. Detectors 422a through 422l receive PC decisions $D_a(n)$ through $D_l(n)$ for base stations 110a through 110l, respectively, from power control processor 412. Each detector 422 passes DOWN decisions to an associated filter 424 and discards UP decisions. Each filter 424 filters the DOWN decisions and provides a power down percentage for an associated base station 110. Each filter 424 may perform a sliding/running average over a particular time window (e.g., with a FIR filter) or may perform filtering in some other manner (e.g., with an IIR filter). Selector 426 receives the power down percentages for base stations 110a through 110l and selects the base station with the largest power down percentage as the RL serving base station. This base station has the largest percentage of power down commands and hence the best RL channel quality for terminal 120x.

As an example, terminal 120x may have an RL candidate set with two base stations 1 and 2 and may send control channels 1 and 2 to these base stations, as described above. Terminal 120x decreases the transmit power of both control channels to the same level if a DOWN command is received from either base station. If the power down percentages show that base station 1 has been sending 50% DOWN commands while base station 2 has been sending 0% DOWN commands, then base station 1 observes better RL channel quality for terminal 120x than base station 2. Terminal 120x may then select base station 1 as the RL serving base station and may convey this selection to the current RL serving base station, the new RL serving base station, or all base stations in the RL candidate set.

The RL serving base station may also be selected based on UP decisions, instead of DOWN decisions. In this case, the base station with the smallest percentage of UP decisions may be deemed as the base station with the best RL channel quality for terminal 120x. In general, the RL serving base station may be selected based on DOWN decisions, UP decisions, or a combination of UP and DOWN decisions.

Figure 5:
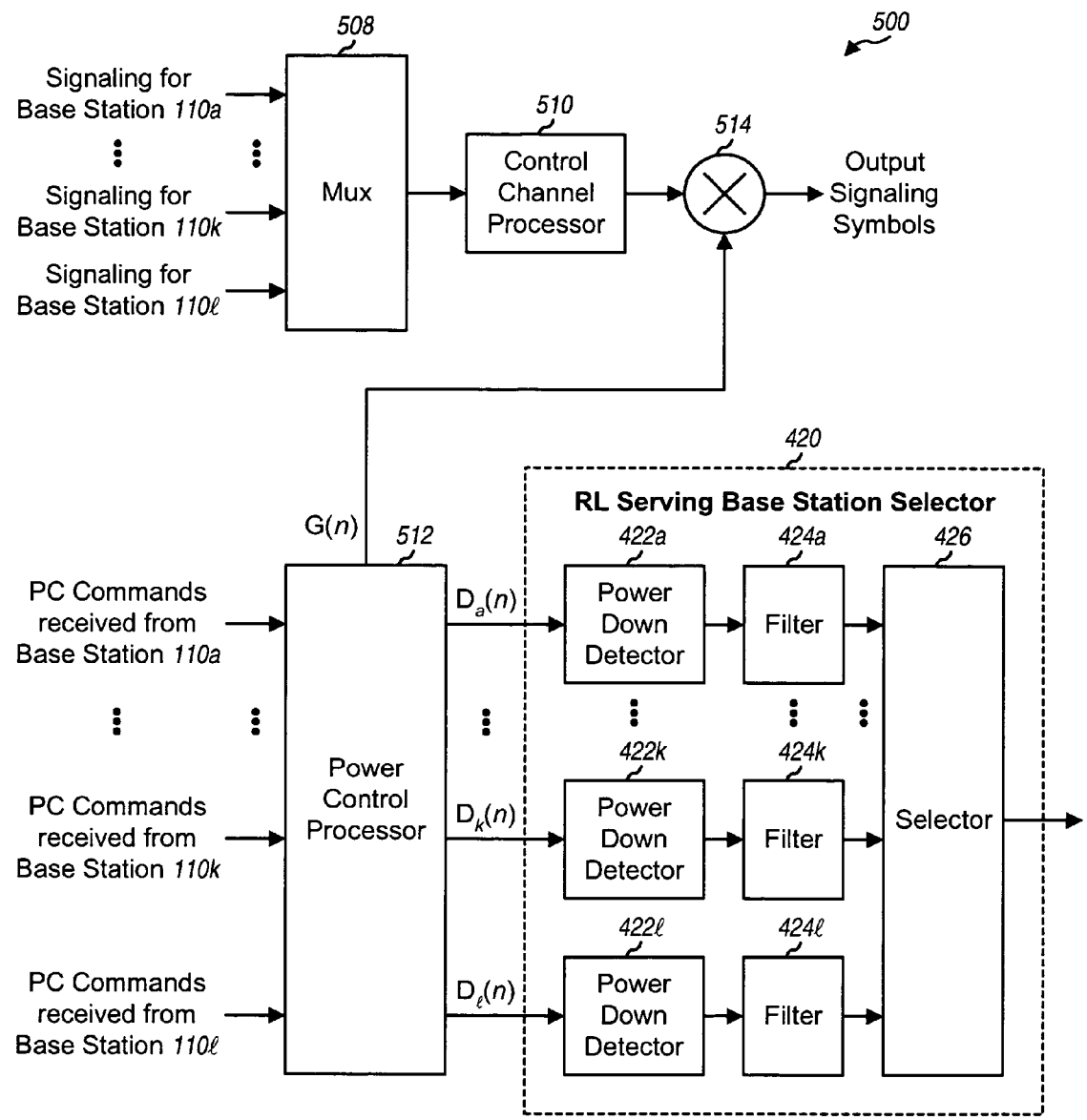
FIG. 5 shows an apparatus that adjusts transmit power of a common control channel and ascertains RL channel qualities based on PC commands.

FIG. 5 shows an embodiment of an apparatus 500 for adjusting transmit power of a common control channel and ascertaining RL channel qualities for terminal 120x based on PC commands. In this embodiment, terminal 120x sends the common control channel to all base stations in the RL candidate set and adjusts the transmit power of this control channel based on PC commands received from all base stations.

In the embodiment shown in FIG. 5, a multiplexer (Mux) 508 receives and multiplexes signaling for base stations 110a through 110l. A control channel processor 510 processes the multiplexed signaling and provides signaling symbols. A power control processor 512 receives PC commands from base stations 110a through 110l and adjusts the transmit power P(n) of the control channel based on the received PC commands, e.g., using the OR-of-the-DOWN rule, as shown in equation (3). A multiplier 514 multiplies the signaling symbols from control channel processor 510 with the transmit power gain G(n) from power control processor 512 and provides scaled signaling symbols. RL serving base station selector 420 selects the base station with the highest power down percentage as the RL serving base station, as described above for FIG. 4.

Figure 6:
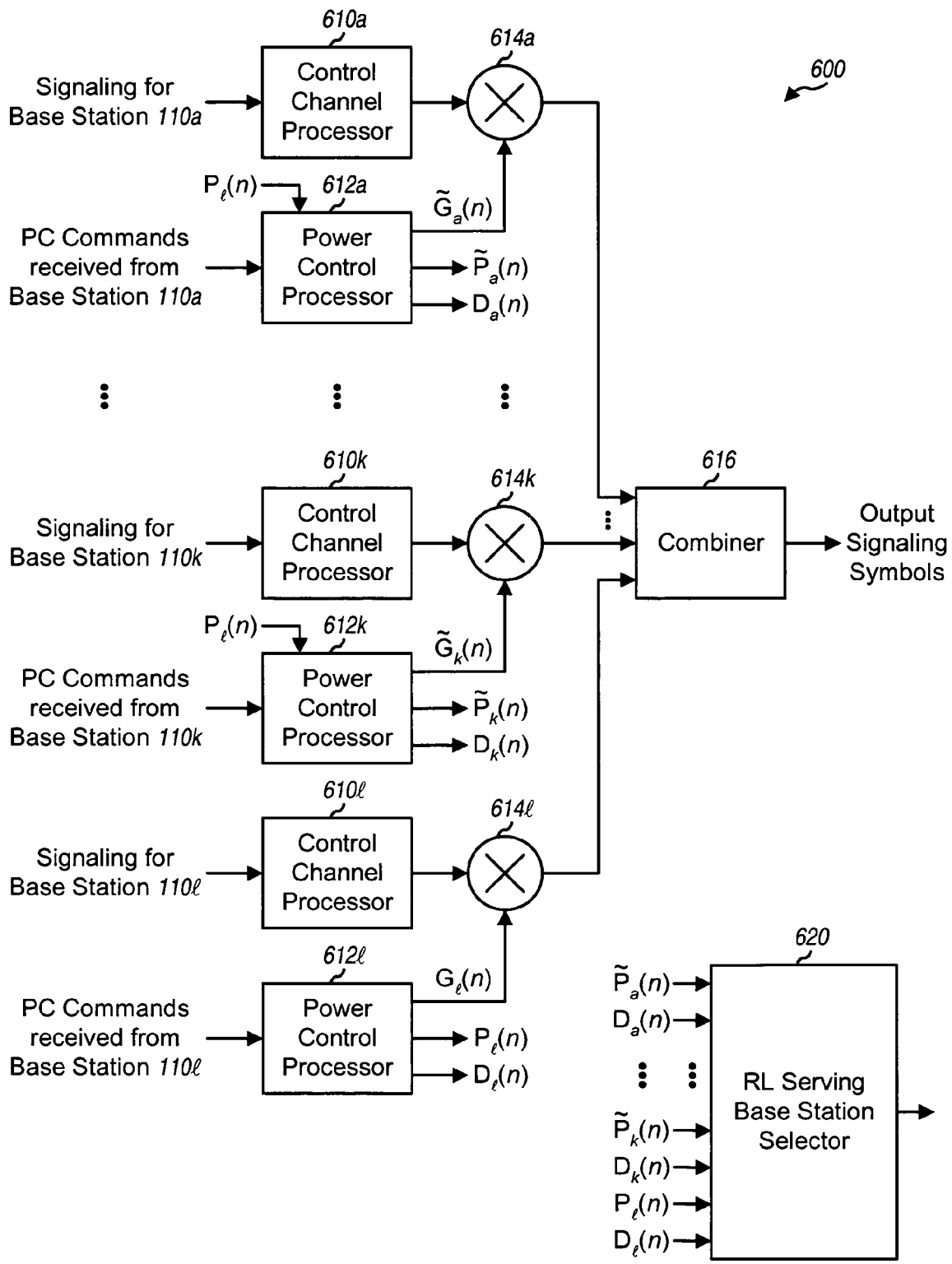
FIG. 6 shows another apparatus that independently adjusts transmit power for different base stations and ascertains RL channel qualities based on PC commands.

FIG. 6 shows an embodiment of an apparatus 600 for independently adjusting transmit power of dedicated control channels and ascertaining RL channel qualities for terminal 120x based on PC commands. In this embodiment, terminal 120x sends separate control channels to the base stations in the RL candidate set, adjusts the transmit power of the control channel for the serving base station to achieve the target C/I, and adjusts the transmit power of the control channel for each non-serving base station based on a different criteria. In an embodiment, the transmit power level for each non-serving base station is set to the lower of (1) the transmit power level needed to achieve the target C/I for the control channel at that base station and (2) the transmit power level for the serving base station. This embodiment ensures that excessive transmit power is not used for the non-serving base stations. The RL channel qualities observed by different base stations for terminal 120x may be ascertained based on a combination of the filtered transmit power levels and the percentages of power down commands for the base stations.

In the embodiment shown in FIG. 6, control channel processors 610a through 610l process signaling for base stations 110a through 110l, respectively, and provide signaling symbols. Power control processors 612a through 612l receive PC commands from base stations 110a through 110l, respectively. Each PC command processor 612 makes a decision on each received PC command and adjusts the transmit power of the control channel for an associated base station 110 based on the PC decisions, e.g., as shown in equation (1). Power control processors 612a through 612k also receive the transmit power level $P_l(n)$ for serving base station 110l and limit the transmit power levels for the non-serving base stations, as follows:

$$\tilde{P}_i(n) = \min\{P_i(n), P_l(n)\}, \text{ for } i \in \{a, \ldots, k\}, \qquad \text{Eq (4)}$$

where $\tilde{P}_i(n)$ is the final transmit power level for non-serving base station i.

Power control processors 612a through 612k also compute the transmit power gains $\tilde{G}_a(n)$ through $\tilde{G}_k(n)$ for the control channels for base stations 110a through 110k, respectively, based on the final transmit power levels $\tilde{P}_a(n)$ through $\tilde{P}_k(n)$ for base stations 110a through 110k, respectively, e.g., as shown in equation (2). Power control processor 612l computes the transmit power gain $G_l(n)$ for the control channel for serving base station 110l based on the transmit power level $P_l(n)$ for the serving base station.

Multipliers 614a through 614l receive and multiply the signaling symbols from control channel processors 610a through 610l, respectively, with the transmit power gains $\tilde{G}_a(n)$ through $\tilde{G}_k(n)$ and $G_l(n)$ from power control processors 612a through 612l, respectively, and provide scaled signaling symbols for base stations 110a through 110l, respectively. A combiner 616 combines the scaled signaling symbols from multipliers 614a through 614l and provides output signaling symbols for all base stations in the RL candidate set.

An RL serving base station selector 620 receives the final transmit power levels $\tilde{P}_a(n)$ through $\tilde{P}_k(n)$ and $P_l(n)$ as well as the PC decisions $D_a(n)$ through $D_l(n)$ for the base stations in the RL candidate set. Selector 620 selects the RL serving base station for terminal 120x based on these inputs, as described below in FIG. 8.

Figure 7:
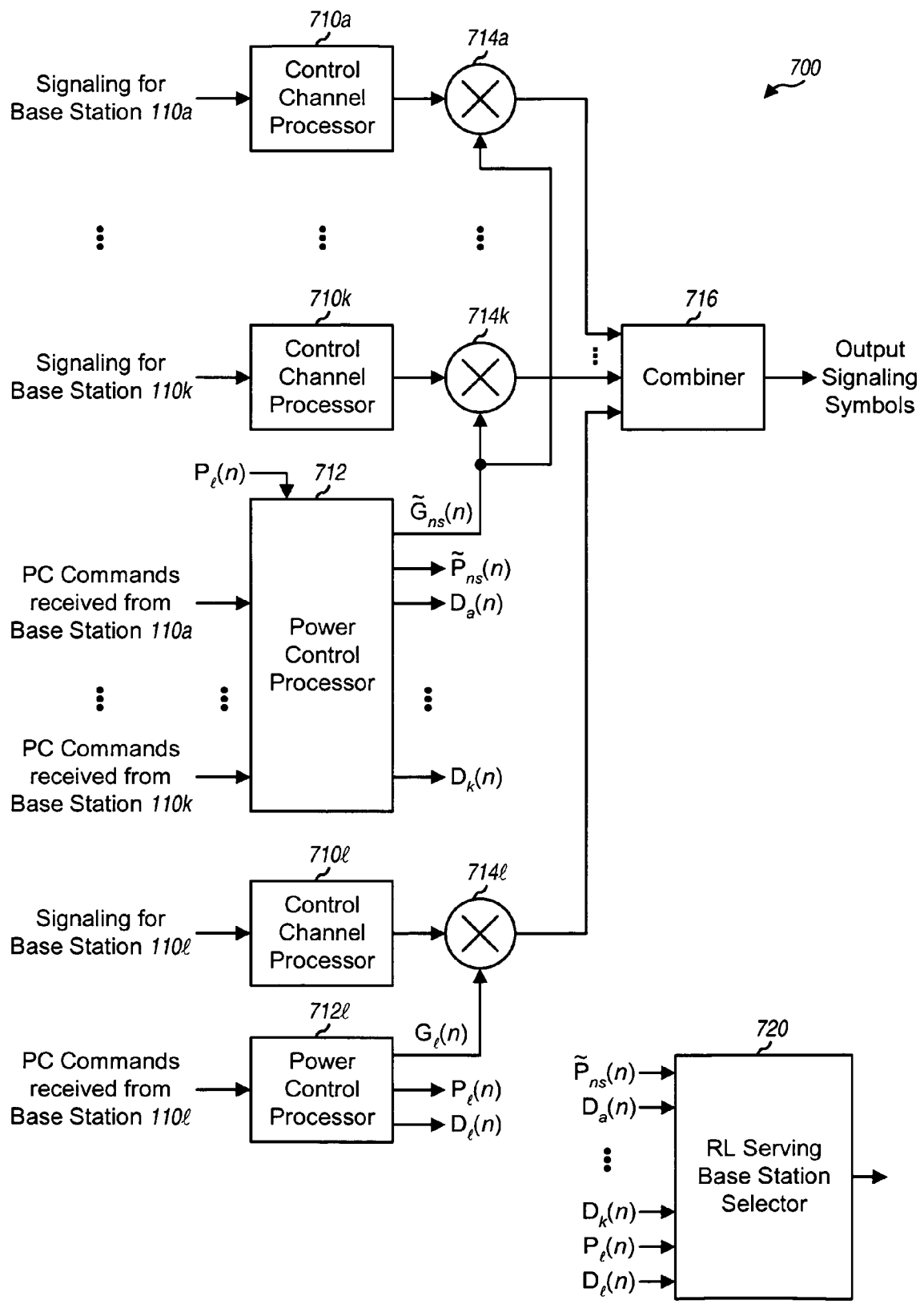
FIG. 7 shows an apparatus that independently adjusts transmit power for a serving base station and jointly adjusts transmit power for non-serving base stations.

FIG. 7 shows an embodiment of an apparatus 700 for independently adjusting transmit power of a dedicated control channel for the serving base station, jointly adjusting transmit power of the dedicated control channels for non-serving base stations, and ascertaining RL channel qualities for terminal 120x based on PC commands. In this embodiment, terminal 120x sends separate control channels to the base stations in the RL candidate set, adjusts the transmit power of the control channel for the serving base station to achieve the target C/I, and adjusts the transmit power of the control channels for the non-serving base stations based on a different criteria. In an embodiment, the transmit power level for the non-serving base stations is jointly adjusted based on the OR-of-the-DOWN rule and further limited by the transmit power level for the serving base station.

In the embodiment shown in FIG. 7, control channel processors 710a through 710l process signaling for base stations 110a through 110l, respectively, and provide signaling symbols. A power control processor 712l receives PC commands from serving base station 110l, makes a decision on each received PC command, and adjusts the transmit power of the control channel for the serving base station based on the PC decisions, e.g., as shown in equation (1). A power control processor 712 receives PC commands from base stations 110a through 110k, makes a decision on each received PC command, and adjusts a transmit power level $P_{ns}(n)$ for the control channels for non-serving base stations 110a through 110k based on the PC decisions for these base stations. Power control processor 712 may apply the OR-of-the-DOWN rule, as shown in equation (3). This embodiment ensures that excessive transmit power is not used for the non-serving base stations.

Power control processor 712 also receives the transmit power level $P_l(n)$ for serving base station 110l and limits the transmit power level for the non-serving base stations as follows:

$$\tilde{P}_{ns}(n) = \min\{P_{ns}(n), P_l(n)\}, \qquad \text{Eq (5)}$$

where $\tilde{P}_{ns}(n)$ is the final transmit power level for the non-serving base stations. Power control processor 712 may compute the transmit power gain $\tilde{G}_{ns}(n)$ for the control channels for the non-serving base stations based on the final transmit power level $\tilde{P}_{ns}(n)$, e.g., as shown in equation (2).

Multipliers 714a through 714k receive and multiply the signaling symbols from control channel processors 710a through 710k, respectively, with the transmit power gain $\tilde{G}_{ns}(n)$ from power control processor 712 and provide scaled signaling symbols for base stations 110a through 110k, respectively. A multiplier 714l receives and multiplies the signaling symbols from control channel processor 710l with the transmit power gain $G_l(n)$ from power control processor 712l and provides scaled signaling symbols for base station 110l. A combiner 716 combines the scaled signaling symbols from multipliers 714a through 714l and provides output signaling symbols for all base stations in the RL candidate set.

An RL serving base station selector 720 receives the final transmit power levels $\tilde{P}_{ns}(n)$ and $P_l(n)$ as well as the PC decisions $D_a(n)$ through $D_l(n)$ for the base stations in the RL candidate set. The RL channel qualities observed by different base stations for terminal 120x may be ascertained based on a combination of the filtered transmit power levels and the percentages of power down commands for the base stations. Selector 720 selects the RL serving base station for terminal 120x based on the received inputs, as described below.

In another embodiment, terminal 120x sends a dedicated control channel to serving base station 110l and a common control channel to non-serving base stations 110a through 110k. The transmit power of the dedicated control channel may be independently adjusted by power control processor 712l. The transmit power of the common control channel may be jointly adjusted by power control processor 712.

Figure 8:
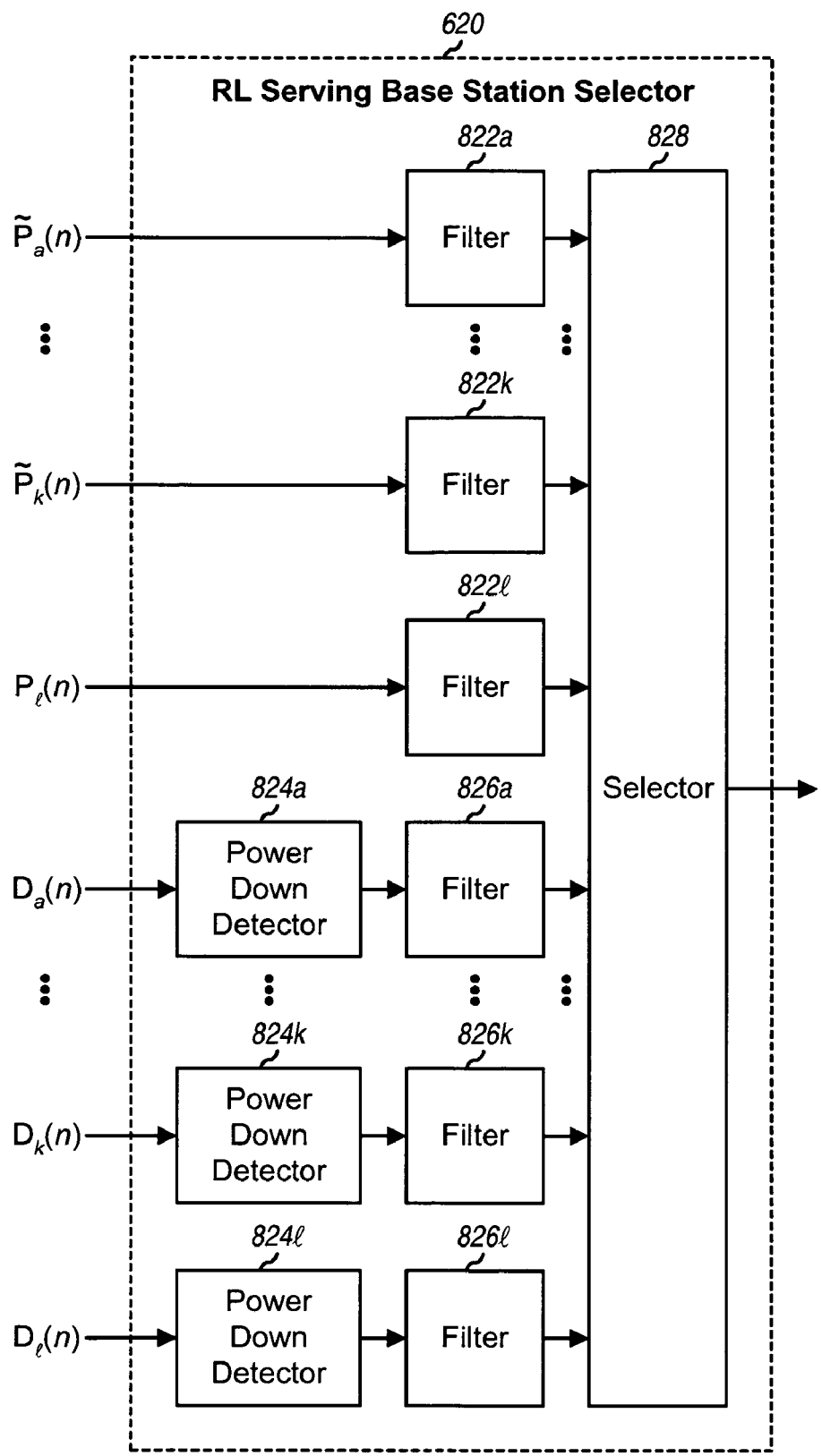
FIG. 8 shows an RL serving base station selector.

FIG. 8 shows an embodiment of RL serving base station selector 620 in FIG. 6. Selector 620 includes filters 822a through 822l, power down detectors 824a through 824l, and filters 826a through 826l for base stations 110a through 110l, respectively, and a selector 828. Filters 822a through 822l filter the final transmit power levels for the control channels for base stations 110a through 110l, respectively, and provides filtered transmit power levels. Detectors 824a through 824l receive PC decisions $D_a(n)$ through $D_l(n)$ for base stations 110a through 110l, respectively, and pass DOWN decisions to filters 826a through 826l, respectively. Each filter 826 filters the DOWN decisions and provides a power down percentage for an associated base station 110. Selector 828 receives the filtered transmit power levels and the power down percentages for base stations 110a through 110l and selects one of these base stations as the RL serving base station. In an embodiment, selector 828 selects the base station with the lowest filtered transmit power level as the RL serving base station. If multiple base stations have the same lowest filtered transmit power level, then selector 828 selects the base station with the largest power down percent among these multiple base stations as the RL serving base station. Hence, the power down percentage is used as a tie break between base stations with the same lowest transmit power level.

RL serving base station selector 720 in FIG. 7 may be implemented similar to selector 620 in FIG. 8. The final transmit power levels $\tilde{P}_{ns}(n)$ and $P_l(n)$ may be filtered to obtain filtered transmit power levels. Selector 720 may select (1) a non-serving base station with the largest power down percentage as the RL serving base station if the filtered $\tilde{P}_{ns}(n)$ is less than the filtered $P_t(n)$ or (2) a base station with the largest power down percentage if the filtered $\tilde{P}_{ns}(n)$ is equal to the filtered $P_t(n)$.

FIGS. 3 through 7 show various embodiments for performing reverse link power control and ascertaining RL channel qualities for terminal 120x based on PC commands. Reverse link power control may also be performed in other manners. The RL channel qualities may also be ascertained based on the PC commands in other manners. For example, only received PC commands of sufficient reliability may be used for power control and to ascertain RL channel qualities, and unreliable PC commands may be discarded.

Figure 9:
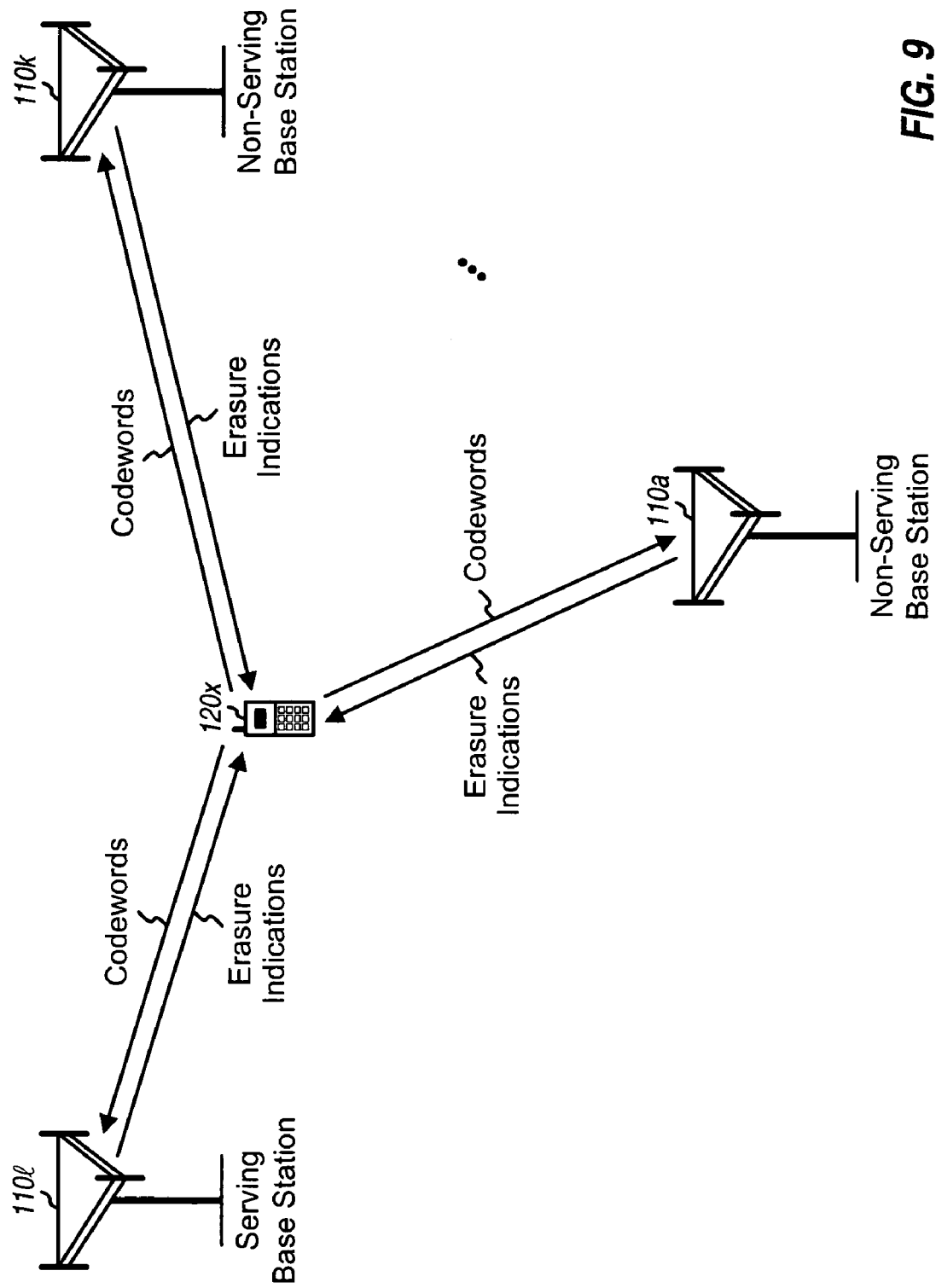
FIG. 9 shows RL serving base station selection of based on erasure indications.

FIG. 9 shows another embodiment for selecting an RL serving base station for terminal 120x. In this embodiment, terminal 120x transmits codewords on the reverse link to base stations 110a through 110l. In general, the codewords may be for any information and may be sent in any manner. In an embodiment, the codewords are for CQI reports. Terminal 120x may make signal quality measurements of the forward link for different base stations, e.g., based on pilots received from these base stations. Terminal 120x may then generate CQI reports for the FL signal quality measurements. Each CQI report may convey the measured FL signal quality for a specific base station. Each CQI report may be a small word containing L bits, where $L \geq 1$, and may be mapped to one of $2^L$ possible codewords in a codebook. Terminal 120x may send the CQI reports on a CQI channel to all base stations.

Base stations 110a through 110l receive the codewords from terminal 120x. Each base station 110 may decode each received codeword and perform erasure detection to determine whether the decoding result meets a desired level of confidence. A received codeword may be deemed (1) "erased" if the decoding result does not meet the desired level of confidence or (2) "non-erased" if the decoding result meets the desired level of confidence. Each base station 110 may send erasure indications for the received codewords to terminal 120x. An erasure indication may indicate whether a received codeword is erased or non-erased. Terminal 120x may adjust the transmit power of the CQI channel based on the received erasure indications. Terminal 120x may also ascertain the RL channel quality observed by each base station 110 for terminal 120x based on the received erasure indications.

Figure 10:
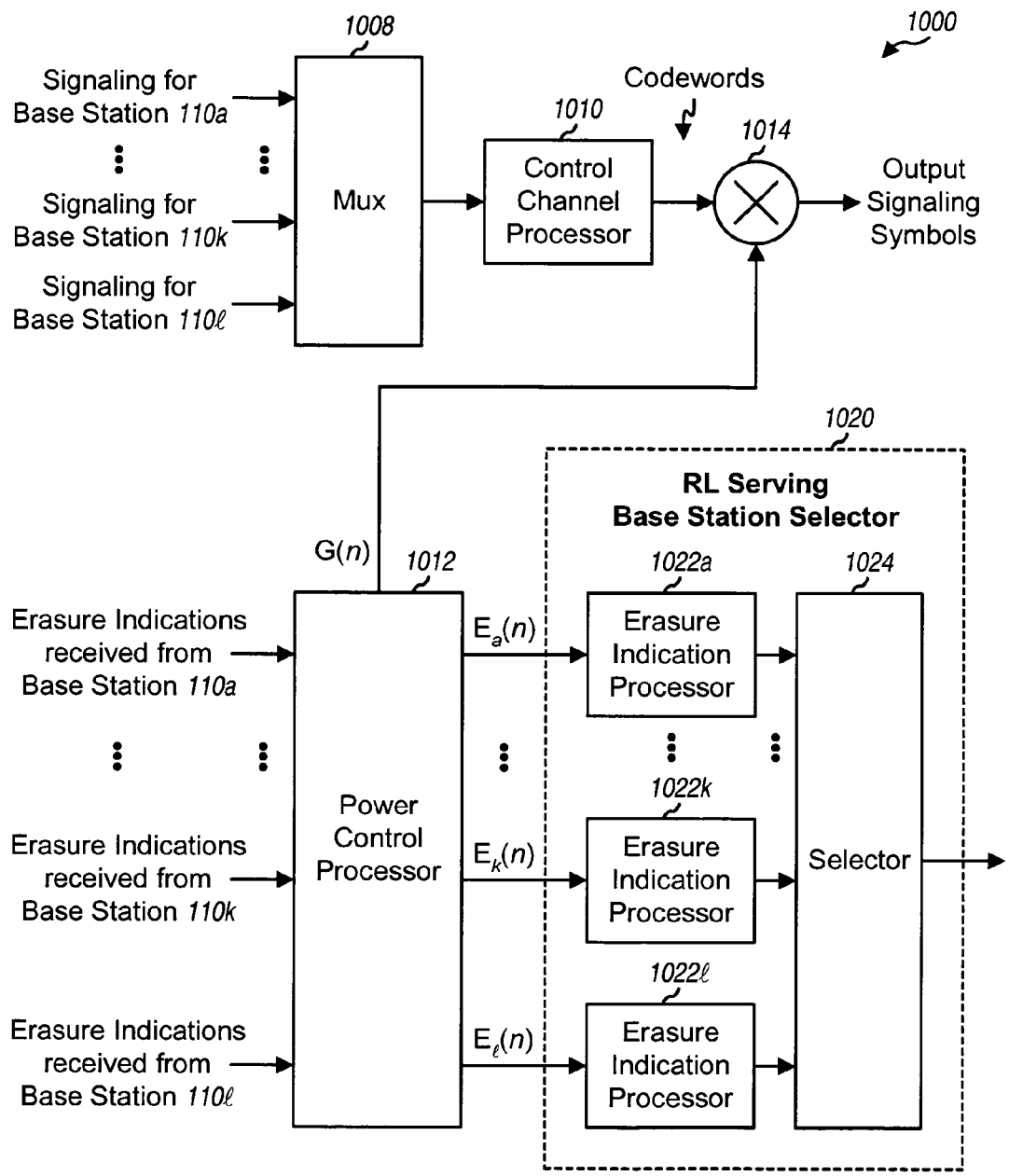
FIG. 10 shows an apparatus that adjusts transmit power of a CQI channel and ascertains RL channel qualities based on erasure indications.

FIG. 10 shows an embodiment of an apparatus 1000 for adjusting transmit power and ascertaining RL channel qualities for terminal 120x based on erasure indications. In this embodiment, a multiplexer 1008 receives and multiplexes signaling (e.g., CQI reports) for base stations 110a through 110l. A control channel processor 1010 processes the multiplexed signaling and provides codewords. A power control processor 1012 receives erasure indications from base stations 110a through 110l, makes a decision on each received erasure indication, and adjusts the transmit power P(n) of the CQI channel based on the erasure decisions. In an embodiment, processor 1012 adjusts the transmit power of the CQI channel based solely on the erasure decisions for serving base station 110l, as follows:

$$P(n) = \begin{cases} P(n-1) + \Delta P_{up} & \text{for an erased decision,} \\ P(n-1) - \Delta P_{dn} & \text{for a non-erased decision,} \end{cases} \quad \text{Eq (6)}$$

where $\Delta P_{up}$ is an up step size for an erased decision, and $\Delta P_{dn}$ is a down step size a non-erased decision.

The $\Delta P_{up}$ and $\Delta P_{dn}$ step sizes may be set based on a target erasure rate, $\text{Pr}_{erasure}$, as follows:

$$\Delta P_{up} = \Delta P_{dn} \cdot \left( \frac{1 - Pr_{erasure}}{Pr_{erasure}} \right). \quad \text{Eq (7)}$$

In other embodiments, processor 1012 may adjust the transmit power of the CQI channel based on erasure decisions for the serving and non-serving base stations. In any case, a multiplier 1014 scales the codewords from control channel processor 1010 with the transmit power gain G(n) from power control processor 1012 and provides scaled signaling symbols.

In the embodiment shown in FIG. 10, an RL serving base station selector 1020 includes erasure indication processors 1022a through 1022l for base stations 110a through 110l, respectively, and a selector 1024. Processors 1022a through 1022l receive erasure decisions $E_a(n)$ through $E_l(n)$ for base stations 110a through 110l, respectively, from power control processor 1012. Each processor 1022 determines an erasure rate for an associated base station 110, e.g., by counting the number of erased decisions within a predetermined time window. Each processor 1022 may perform filtering and/or other processing, e.g., as described above for filters 322 in FIG. 3. Selector 1024 receives the erasure rates for base stations 110a through 110l and selects the base station with the lowest erasure rate as the RL serving base station.

In an embodiment that is described above, base stations 110 send single-bit erasure indications that indicate whether the received codewords are erased or non-erased. In another embodiment, base stations 110 send multi-bit values that indicate the quality of the received codewords and/or the quality of the reverse link for terminal 120x.

Terminal 120x may be able to obtain a better ranking of the relative RL channel qualities for base stations 110a through 110l based on the erasure indications. For example, if the reverse link to base station 1 is 2 dB worse than the reverse link to base station 2 and the OR-of-the-DOWN rule is used, then base station 1 may simply send a series of UP commands. In this case, it may not be possible to ascertain how much worse the reverse link to base station 1 is relative to the reverse link to base station 2 based on the UP commands from base station 1. However, base station 1 may send 65% erasure rate whereas base station 2 may send 50% erasure rate. The relative RL channel qualities for base stations 1 and 2 may then be determined based on their erasure rates. A look-up table may store channel quality (e.g., in dB) versus erasure rate for a given operation scenario and may be used to determine the relative RL channel qualities. Multiple look-up tables may be used for different operating scenarios, e.g., different speed. The relative RL channel quality information may be used to select FL and/or RL serving base stations. For example, it may be desirable to select the FL serving base station as the RL serving base station if the RL signal quality for the FL serving base station is within Q dB of the best RL base station.

FIGS. 2 through 10 show various embodiments of sending one or more control channels on the reverse link to base stations, receiving feedback from the base stations on the forward link, and performing power control and RL serving base station selection based on the received feedback. In general, a terminal may send various types of signaling in various formats on various control channels to the base stations. The terminal may also receive various types of feedback from the base stations, e.g., PC commands, erasure indications, RL signal quality measurements, received signal power measurements, and so on, or any combination thereof. The feedback may be processed (e.g., screened, filtered, and so on) to determine the best RL serving base station for the terminal.

Figure 11:
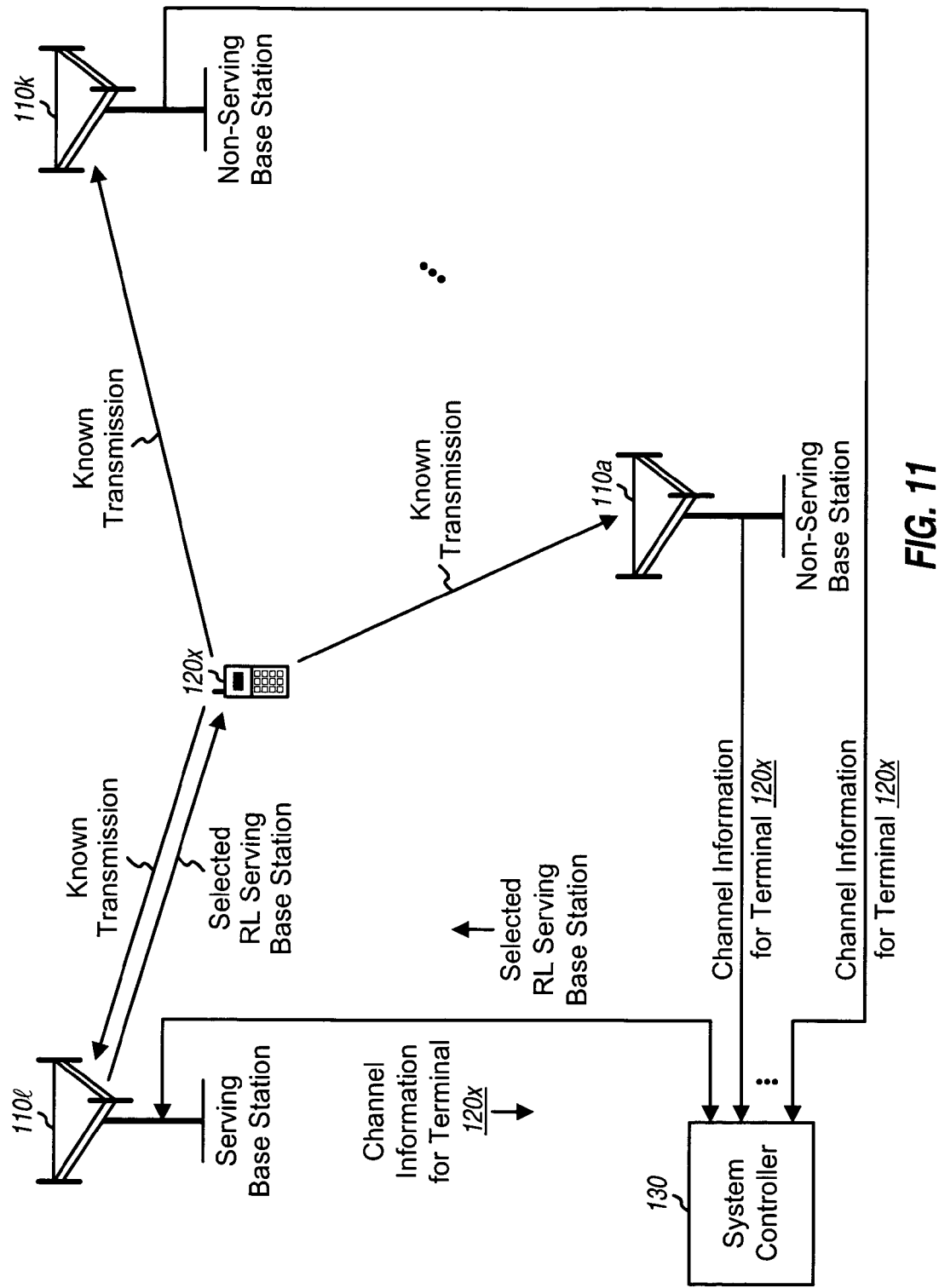
FIG. 11 shows selection of an RL serving base station based on a known transmission sent by the terminal.

FIG. 11 shows yet another embodiment for selecting an RL serving base station for terminal 120x. In this embodiment, terminal 120x transmits a known transmission, which may be pilot or some other transmission that is known by both terminal 120x and base stations 110. In an embodiment, the known transmission is a pseudo-random number (PN) sequence that is sent, e.g., at a specified power level and a specified time interval. In general, the known transmission may comprise dedicated transmissions sent to each base station or a common transmission sent to all base stations. In any case, the known transmission may be used to estimate the RL channel qualities for terminal 120x.

In an embodiment, each base station 110 estimates the channel quality of the reverse link for terminal 120x based on the received known transmission. In another embodiment, each base station measures the received power of the known transmission from terminal 120x. The base stations may be assumed to have similar noise and interference characteristics, and the received power measurements may then be used as RL channel quality estimates for the terminal.

A designated entity (e.g., serving base station 110l, system controller 130, or terminal 120x) may collect channel information for terminal 120x from all base stations in the RL candidate set. This channel information may comprise RL channel quality estimates, received power measurements, and so on. In the embodiment shown in FIG. 11, system controller 130 is the designated entity, and base stations 110a through 110l send the channel information for terminal 120x via a backhaul to system controller 130. System controller 130 may or may not filter the RL channel quality estimates or received power measurements for each base station. System controller 130 may then select the base station with the best RL channel quality (e.g., the largest filtered or unfiltered received power measurement) as the RL serving base station for terminal 120x. System control 130 may send the selected RL serving base station to the current and/or new RL serving base station. The selected RL serving base station may be conveyed to terminal 120x by sending an explicit message to terminal 120x, by making an RL channel assignment to terminal 120x, or by some other means.

If serving base station 110l is the designated entity, then other base stations send the channel information for terminal 120x to base station 110l, which may then select the RL serving base station for terminal 120x. If terminal 120x is the designated entity, then the base stations may send the channel information via over-the-air signaling to terminal 120x, which may then select the RL serving base station. Terminal 120x may convey the selected RL serving base station to the current RL serving base station, the new RL serving base station, or all base stations in the RL candidate set.

In some embodiments described above, the RL channel qualities for terminal 120x are estimated by the base stations based on control channel(s) sent by terminal 120x. The base stations may send feedback (e.g., PC commands and/or erasure indications) indicative of the RL channel qualities for terminal 120x. The transmit power levels for the control channels sent to different base stations and/or the power down percentages for the base stations may be used to ascertain the relative RL channel qualities observed by these base stations for terminal 120x. In other embodiments, the RL channel qualities for terminal 120x may be estimated based on a known transmission (e.g., pilot and/or data) sent by terminal 120x. In general, the RL channel qualities for terminal 120x may be estimated based on any transmission sent by terminal 120x, and the selection of the RL serving base station may be made using any type of information and by any. entity, e.g., terminal 120x, serving base station 110l, system 130, or some other entity.

The RL serving base station may also be selected based on the FL serving base station, the FL channel qualities, and/or other information for the forward link. In an embodiment, if the reverse link of the FL serving base station is only slightly worse than (e.g., within Q dB of) the reverse link of the best RL base station, then the FL serving base station is selected as the RL serving base station. In another embodiment, if the FL channel quality is too weak to adequately support FL control channels (e.g., an ACK channel), then the terminal may weigh this information in selecting the RL serving base station.

The embodiments described herein allow the RL channel qualities for a terminal to be ascertained separately from the FL channel qualities for the same terminal. For example, the RL channel qualities may be ascertained based on the control channel(s) or the known transmission sent by the terminal on the reverse link, whereas the FL channel qualities may be ascertained based on pilots sent by the base stations on the forward link. Separate candidate sets may be maintained for the forward and reverse links. This allows for independent selection of the FL serving base station and the RL serving base station.

Figure 12:
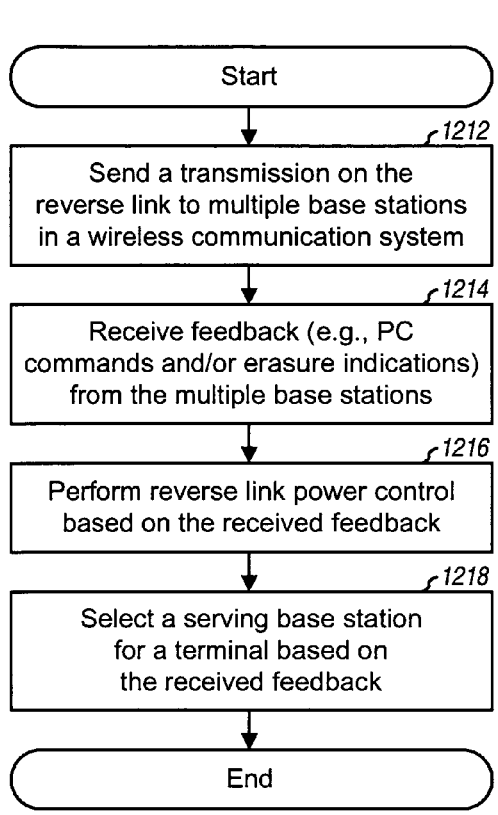
FIGS. 12 and 13 show a process and an apparatus, respectively, for selecting a serving base station for a terminal based on PC commands.

FIG. 12 shows an embodiment of a process 1200 for selecting a serving base station for a terminal based on PC commands. Process 1200 may be performed by the terminal. A transmission is sent on the reverse link to multiple base stations in a wireless communication system (block 1212). The transmission may be for signaling (e.g., CQI reports, codewords, ACKs, requests, and so on) sent on a control channel, data sent on a data channel, or a combination thereof. Feedback is received from the multiple base stations and processed (block 1214). The feedback may be for PC commands, erasure indications, and/or other information. Each base station may generate feedback (e.g., PC commands and/or erasure indications) based on the control channel, a known transmission, and/or some other transmission sent by the terminal.

Reverse link power control is performed based on the received feedback (block 1216). In one embodiment, the transmit power level for each base station is independently adjusted based on the PC commands received from that base station, e.g., as shown in FIG. 3. In another embodiment, the transmit power level for each non-serving base station is further limited based on the transmit power level for the serving base station, e.g., as shown in FIG. 6. In yet another embodiment, the transmit power level for all base stations is jointly adjusted based on the PC commands received from these base stations, e.g., as shown in FIGS. 4 and 5. In yet another embodiment, the transmit power level for the serving base station is independently adjusted based on the PC commands received from this base station, and the transmit power level for the non-serving base stations is jointly adjusted based on the PC commands received from these base stations, e.g., as shown in FIG. 7. The transmit power levels for the non-serving base stations may be limited based on the transmit power level for the serving base station, e.g., as shown in FIGS. 6 and 7. The embodiments described above may also be performed with erasure indications instead of PC commands, with both PC commands and erasure indications, or with other types of feedback from the base stations.

A serving base station is selected for the terminal for the reverse link based on the received feedback (block 1218). In one embodiment, the transmit power level for each base station is determined based on the PC commands received from that base station. The serving base station is then selected based on the (filtered or unfiltered) transmit power levels for all base stations, e.g., the base station with the lowest transmit power level may be selected. In another embodiment, the percentage of power down commands for each base station is determined. The serving base station is then selected based on the percentages of power down commands for all base stations, e.g., the base station with the largest percentage of power down commands may be selected. In yet another embodiment, the transmit power level and the percentage of power down commands are determined for each base station based on the PC commands received from that base station. The serving base station is then selected based on the transmit power levels and the percentages of power down commands for all base stations. The base station with the lowest transmit power level may be selected as the serving base station. If more than one base station has the lowest transmit power level, then the base station with the largest percentage of power down commands among the more than one base station may be selected as the serving base station.

In yet another embodiment, an erasure rate is determined for each base station based on erasure indications received from that base station. The serving base station is then selected based on the erasure rates for all base stations, e.g., the base station with the lowest erasure rate may be selected. In general, the serving base station may be selected based on PC commands, erasure indications, both PC commands and erasure indications, other types of feedback, or any combination of feedback from the base stations. In any case, the serving base station is designated to serve the terminal on the reverse link, e.g., schedule the terminal for transmission on the reverse link, receive data transmission sent by the terminal, and so on.

The base stations selectable to serve the terminal on the reverse link may be maintained in an RL candidate set. The base stations selectable to serve the terminal on the forward link may be maintained in an FL candidate set. The FL and RL candidate sets may be disjoint, and base stations may be added to and removed from each candidate set independent of the other candidate set.

Figure 13:
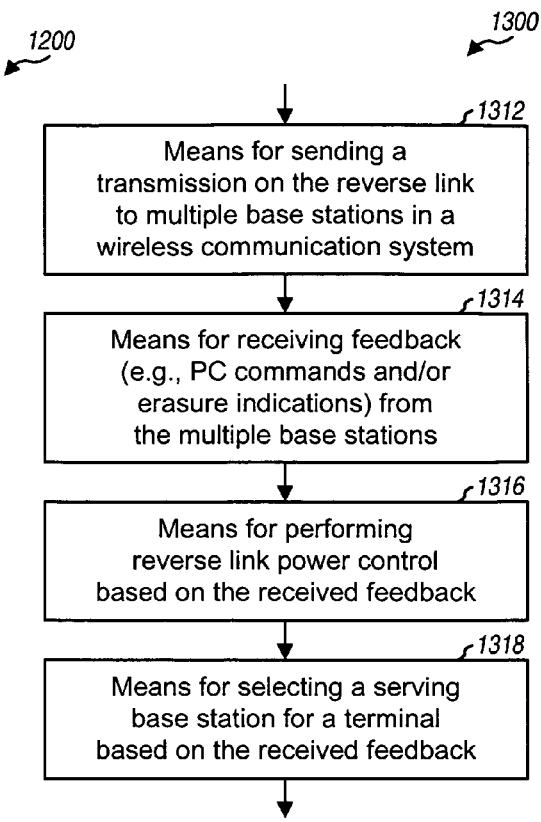

FIG. 13 shows an embodiment of an apparatus 1300 for selecting a serving base station for a terminal based on PC commands. Apparatus 1300 includes means for sending a transmission on the reverse link to multiple base stations in a wireless communication system (block 1312), means for receiving feedback from the multiple base stations (block 1314), means for performing reverse link power control based on the received feedback (block 1316), and means for selecting a serving base station for the terminal for the reverse link based on the received feedback (block 1318).

Figure 14:
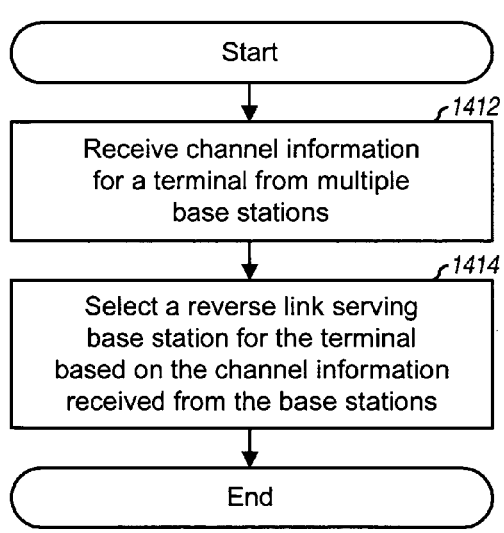
FIGS. 14 and 15 show a process and an apparatus, respectively, for selecting a serving base station for a terminal based on a known transmission on the reverse link.

FIG. 14 shows an embodiment of a process 1400 for selecting an RL serving base station for a terminal. Process 1400 may be performed by a designated entity, which may be the terminal, the current serving base station, a system controller, or some other entity.

Channel information for the terminal is received from multiple base stations (block 1412). The channel information from each base station is indicative of the channel quality observed by that base station for the terminal. The channel information from each base station may be derived based on a control channel, a known transmission (e.g., a PN sequence or a pilot), and/or some other transmission sent by the terminal on the reverse link. The channel information from each base station may comprise received power measurements, RL channel quality estimates, PC commands, and/or other types of information. An RL serving base station is selected for the terminal based on the channel information received from all base stations (block 1414). For example, the base station with the largest received power measurement or the highest RL channel quality estimate may be selected as the RL serving base station.

If process 1400 is performed by the terminal, then the terminal may receive the channel information from the base stations on the forward link and may send the selected serving base station on the reverse link to the current serving base station, the new serving base station, and/or some other base station. If process 1400 is performed by a network entity, then that network entity may receive the channel information from the base stations via a backhaul and may send the selected serving base station via the backhaul to one or more base stations in the RL candidate set.

Figure 15:
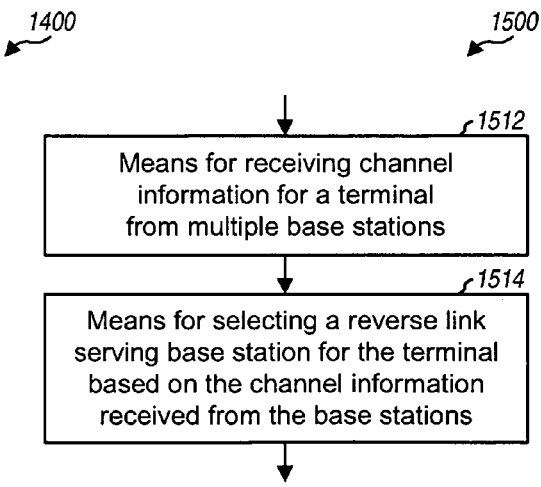

FIG. 15 shows an embodiment of an apparatus 1500 for selecting an RL serving base station for a terminal. Apparatus 1500 includes means for receiving channel information for the terminal from multiple base stations (block 1512), and means for selecting an RL serving base station for the terminal based on the channel information received from the base stations (block 1514).

The techniques described herein allow for determination of the RL channel quality observed by each potential serving base station for a terminal. This information may be used to select the best base station to serve the terminal on the reverse link, for handoff, and for other purposes. This information is especially pertinent in a system that schedules transmissions on the reverse link and has a frequency reuse of one.

The techniques described herein may be used for various multiple-access systems such as CDMA, TDMA, OFDMA, and Single Carrier FDMA (SC-FDMA) systems. The techniques may also be used for FDD and TDD systems. The techniques are particularly beneficial for OFDMA systems that utilize Orthogonal Frequency Division Multiplexing (OFDM). OFDM partitions the overall system bandwidth into multiple (K) orthogonal frequency subcarriers, which are also called tones, bins, and so on. An OFDMA system may use time and/or frequency division multiplexing to achieve orthogonality among multiple transmissions for multiple terminals. As an example, for each link, different terminals may be allocated different subcarriers, and the transmission for each terminal may be sent on the subcarrier(s) allocated to that terminal. By using disjoint subcarriers for different terminals, interference among these terminals may be avoided or reduced, and improved performance may be achieved. However, the number of subcarriers available for transmission on each link is limited (to K) by the OFDM structure used for the OFDMA system. The limited number of subcarriers places an upper limit on the number of terminals that may transmit and/or receive simultaneously without interfering one another.

Having disjoint FL and RL serving base stations may be especially beneficial in an OFDMA system in order to better exploit the differences in the FL and RL channel qualities.

Figure 16:
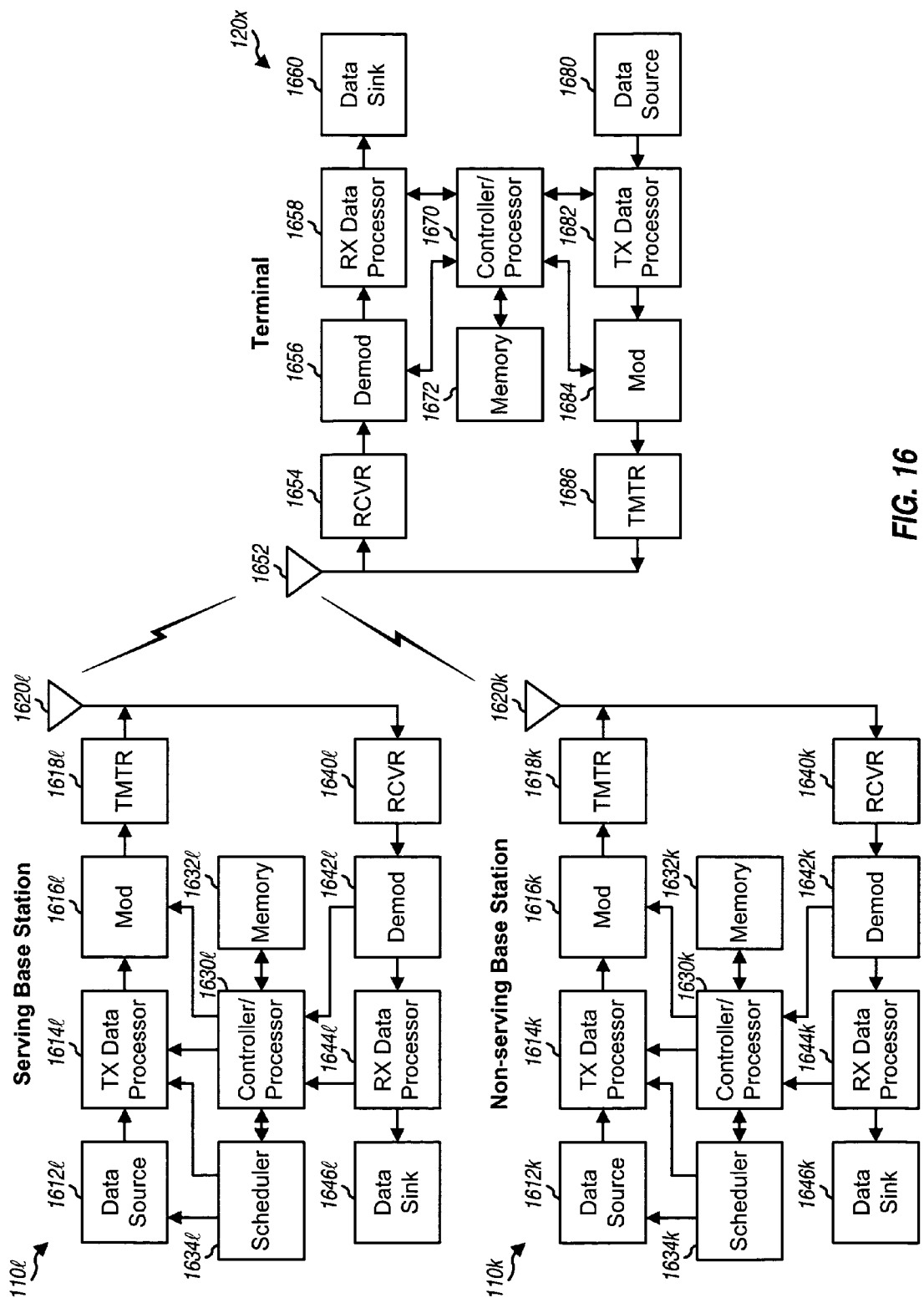
FIG. 16 shows a block diagram of the terminal and two base stations.

FIG. 16 shows a block diagram of an embodiment of terminal 120x, serving base station 110l, and non-serving base station 110k in FIG. 2. At serving base station 110l, a transmit (TX) data processor 1614l receives traffic data from a data source 1612l and signaling from a controller/processor 1630l and a scheduler 1634l. Controller/processor 1630l may provide PC commands and/or other feedback information to adjust the transmit power of the terminals communicating with base station 110l. Scheduler 1634l may provide assignments of data channels and/or subcarriers to the terminals. TX data processor 1614l processes (e.g., encodes, interleaves, and symbol maps) the traffic data and signaling and provides data symbols and signaling symbols, respectively. A modulator (Mod) 1616*l* multiplexes pilot symbols with the data and signaling symbols, performs modulation on the multiplexed symbols (e.g., for OFDMA and/or CDMA), and provides output chips. A transmitter (TMTR) 1618*l* conditions (e.g., converts to analog, amplifies, filters, and frequency upconverts) the output chips and generates a forward link signal, which is transmitted via an antenna 1620*l*.

Non-serving base station 110*k* similarly processes traffic data and signaling for terminals being served by base station 110*k* and terminals having base station 110*k* in their candidate sets. The traffic data and signaling are processed by a TX data processor 1614*k*, modulated by a modulator 1616*k*, conditioned by a transmitter 1618*k*, and transmitted via an antenna 1620*k*.

At terminal 120*x*, an antenna 1652 receives the forward link signals from base stations 110*k* and 110*l* and possibly other base stations. A receiver (RCVR) 1654 conditions (e.g., filters, amplifies, frequency downconverts, and digitizes) a received signal from antenna 1652 and provides samples. A demodulator (Demod) 1656 performs demodulation on the samples (e.g., for OFDMA and/or CDMA) and provides symbol estimates. An RX data processor 1658 processes (e.g., symbol demaps, deinterleaves, and decodes) the symbol estimates, provides decoded data to a data sink 1660, and provides detected signaling (e.g., received PC commands) to a controller/processor 1670. In general, the processing by RX data processor 1658 and demodulator 1656 is complementary to the processing by TX data processor 1614 and modulator 1616, respectively, at base stations 110.

On the reverse link, a TX data processor 1682 processes traffic data from a data source 1680 and signaling from controller/processor 1670 and generates symbols. The symbols are modulated by a modulator 1684 and conditioned by a transmitter 1686 to generate a reverse link signal, which is transmitted from antenna 1652. Controller 1670 may provide the transmit power levels to use for the control channels and/or a known transmission to be sent to the base stations in the RL candidate set.

At serving base station 110*l*, the reverse link signals from terminal 120*x* and other terminals are received by antenna 1620*l*, conditioned by a receiver 1640*l*, demodulated by a demodulator 1642*l*, and processed by an RX data processor 1644*l*. Processor 1644*l* provides decoded data to a data sink 1646*l* and detected signaling to controller/processor 1630*l*. Receiver 1640*l* may estimate the RL channel quality (e.g., the received C/I) of the control channel and/or known transmission sent by each terminal and may provide this information to controller/processor 1630*l*. Controller/processor 1630*l* may derive PC commands and/or other feedback information for each terminal based on the RL channel quality estimate for that terminal, as described above. Non-serving base station 110*k* may similarly detect signaling sent by terminal 120*x* and may send PC commands and/or other feedback information to terminal 120*x*.

Controllers/processors 1630*k*, 1630*l* and 1670 direct the operations of various processing units at base stations 110*k* and 110*l* and terminal 120*x*, respectively. These controllers/processors may also perform various functions for power control and serving base station selection. For example, controller/processor 1670 may implement apparatus 300 through 700 shown in FIGS. 3 through 7. Controller/processor 1670 may also implement processes 1200 and/or 1400 in FIGS. 12 and 14. Memories 1632*k*, 1632*l* and 1672 store data and program codes for base stations 110*k* and 110*l* and terminal 120*x*, respectively. Schedulers 1634*k* and 1634*l* schedule terminals communicating with base stations 110*k* and 110*l*, respectively, and assign data channels and/or subcarriers to the scheduled terminals.

The techniques described herein may be implemented by various means. For example, these techniques may be implemented in hardware, firmware, software, or a combination thereof. For a hardware implementation, the processing units at a terminal or a base station may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For a firmware and/or software implementation, the techniques described herein may be implemented with modules (e.g., procedures, functions, and so on) that perform the functions described herein. The firmware and/or software codes may be stored in a memory (e.g., memory 1672 in FIG. 16) and executed by a processor (e.g., processor 1670). The memory may be implemented within the processor or external to the processor.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. An apparatus comprising:
   at least one processor configured
   to send a transmission on reverse link to multiple base stations in a wireless communication system,
   to receive feedback metrics from the multiple base stations, wherein the feedback metrics include erasure indications, and wherein erasure indications are used to determine if decoding of one or more codewords in the transmission on the reverse link meet a predetermined level of confidence, and
   to select a serving base station for a terminal for the reverse link based on one or more of the received feedback metrics; and
   a memory coupled to the at least one processor.

2. The apparatus of claim 1, wherein the feedback metrics further comprise signal quality measurements or received signal power measurements.

3. The apparatus of claim 1, wherein the feedback metrics further include power control (PC) commands, and wherein the at least one processor is configured to determine transmit power level for each of the multiple base stations based on PC commands received from the base station, and to select the serving base station based on transmit power levels for the multiple base stations.

4. The apparatus of claim 3, wherein the at least one processor is configured to select a base station with a lowest transmit power level as the serving base station.

5. The apparatus of claim 1, wherein the feedback metrics further include power control (PC) commands, and wherein the at least one processor is configured to determine percentage of power down commands for each of the multiple base stations, and to select the serving base station based on percentages of power down commands for the multiple base stations.

6. The apparatus of claim 5, wherein the at least one processor is configured to select a base station with a largest percentage of power down commands as the serving base station.

7. The apparatus of claim 1, wherein the feedback metrics further include power control (PC) commands, and wherein the at least one processor is configured to determine transmit power level for each of the multiple base stations based on PC commands received from the base station, to determine percentage of power down commands for each of the multiple base stations, and to select the serving base station based on transmit power levels and percentages of power down commands for the multiple base stations.

8. The apparatus of claim 7, wherein the at least one processor is configured to select a base station with a lowest transmit power level as the serving base station, and if more than one base station has the lowest transmit power level, to select a base station with a largest percentage of power down commands among the more than one base station as the serving base station.

9. The apparatus of claim 1, wherein the feedback metrics further include power control (PC) commands, and wherein the at least one processor is configured to independently adjust transmit power level for each of the multiple base stations based on PC commands received from the base station.

10. The apparatus of claim 9, wherein the at least one processor is configured to limit transmit power level for each non-serving base station based on transmit power level for the serving base station.

11. The apparatus of claim 1, wherein the feedback metrics further include power control (PC) commands, and wherein the at least one processor is configured to jointly adjust transmit power level for the multiple base stations based on the PC commands received from the multiple base stations.

12. The apparatus of claim 1, wherein the feedback metrics further include power control (PC) commands, and wherein the at least one processor is configured to independently adjust transmit power level for the serving base station based on PC commands received from the serving base station, and to jointly adjust transmit power level for non-serving base stations based on PC commands received from the non-serving base stations.

13. The apparatus of claim 12, wherein the at least one processor is configured to limit the transmit power level for the non-serving base stations based on the transmit power level for the serving base station.

14. The apparatus of claim 1, wherein the at least one processor is configured to determine an erasure rate for each of the multiple base stations based on erasure indications received from the base station, and to select the serving base station based on erasure rates for the multiple base stations.

15. The apparatus of claim 14, wherein the at least one processor is configured to select a base station with a lowest erasure rate as the serving base station.

16. The apparatus of claim 1, wherein the at least one processor is configured to send a control channel to the multiple base stations, and wherein feedback from each base station is generated based on the control channel.

17. The apparatus of claim 1, wherein the at least one processor is configured to send a first control channel to the serving base station and to send a second control channel to remaining ones of the multiple base stations, and wherein feedback from each base station is generated based on the first or second control channel sent to the base station.

18. The apparatus of claim 1, wherein the serving base station is designated to serve the terminal on reverse link.

19. The apparatus of claim 18, wherein the at least one processor is configured to select the serving base station for the terminal for the reverse link further based on information for a serving base station for the terminal for forward link.

20. The apparatus of claim 18, wherein the at least one processor is configured to select the serving base station for the terminal further based on channel qualities for candidate base stations for forward link.

21. The apparatus of claim 1, wherein the at least one processor is configured to maintain a first candidate set with the multiple base stations selectable to serve the terminal on reverse link, and to maintain a second candidate set with at least one base station selectable to serve the terminal on forward link.

22. The apparatus of claim 21, wherein base stations are added to and removed from the first candidate set independent of the second candidate set.

23. The apparatus of claim 1, wherein the wireless communication system is an Orthogonal Frequency Division Multiple Access (OFDMA) system.

24. A method comprising:
sending a transmission on reverse link to multiple base stations in a wireless communication system;
receiving feedback metrics from the multiple base stations, wherein the feedback metrics include erasure indications, and wherein erasure indications are used to determine if decoding of one or more codewords in the transmission on the reverse link meet a predetermined level of confidence; and
selecting a serving base station for a terminal for the reverse link based on one or more the received feedback metrics.

25. The method of claim 24, wherein the sending the transmission on the reverse link comprises sending the transmission on a control channel to the multiple base stations, and wherein feedback from each base station is generated based on the control channel received by the base station.

26. The method of claim 24, wherein the feedback metrics further comprise power control (PC) commands, and wherein the selecting the serving base station comprises determining transmit power level for each of the multiple base stations based on PC commands received from the base station, and selecting a base station with a lowest transmit power level as the serving base station.

27. The method of claim 24, wherein the feedback metrics further comprise power control (PC) commands, and wherein the selecting the serving base station comprises determining percentage of power down commands for each of the multiple base stations, and selecting a base station with a largest percentage of power down commands as the serving base station.

28. The method of claim 24, wherein the feedback metrics further comprise power control (PC) commands, and wherein the selecting the serving base station comprises determining transmit power level for each of the multiple base stations based on PC commands received from the base station, determining percentage of power down commands for each of the multiple base stations, and selecting the serving base station based on transmit power levels and percentages of power down commands for the multiple base stations.

29. The method of claim 24, wherein the selecting the serving base station comprises determining an erasure rate for each of the multiple base stations based on erasure indications received from the base station, and selecting a base station with a lowest erasure rate as the serving base station.

30. An apparatus comprising:
a transmitter for sending a transmission on reverse link to multiple base stations in a wireless communication system;
means for receiving feedback metrics from the multiple base stations, wherein the feedback metrics include erasure indications, and wherein erasure indications are used to determine if decoding of one or more codewords in the transmission on the reverse link meet a predetermined level of confidence; and
means for selecting a serving base station for a terminal for the reverse link based on one or more of the received feedback metrics.

31. The apparatus of claim 30, wherein the means for sending the transmission on the reverse link comprises means for sending the transmission on a control channel to the multiple base stations, and wherein feedback from each base station is generated based on the control channel received by the base station.

32. The apparatus of claim 30, wherein the feedback metrics further comprise power control (PC) commands, and wherein the means for selecting the serving base station comprises means for determining transmit power level for each of the multiple base stations based on PC commands received from the base station, and means for selecting a base station with a lowest transmit power level as the serving base station.

33. The apparatus of claim 30, wherein the feedback metrics further comprise power control (PC) commands, and wherein the means for selecting the serving base station comprises means for determining percentage of power down commands for each of the multiple base stations, and means for selecting a base station with a largest percentage of power down commands as the serving base station.

34. The apparatus of claim 30, wherein the feedback metrics further comprise power control (PC) commands, and wherein the means for selecting the serving base station comprises means for determining transmit power level for each of the multiple base stations based on PC commands received from the base station, means for determining percentage of power down commands for each of the multiple base stations, and means for selecting the serving base station based on transmit power levels and percentages of power down commands for the multiple base stations.

35. The apparatus of claim 30, wherein the means for selecting the serving base station comprises means for determining an erasure rate for each of the multiple base stations based on erasure indications received from the base station, and means for selecting a base station with a lowest erasure rate as the serving base station.

36. A processor readable media for storing instructions operable in a wireless device to:
send a transmission on reverse link to multiple base stations in a wireless communication system;
receive feedback metrics from the multiple base stations, wherein the feedback metrics include erasure indications, and wherein erasure indications are used to determine if decoding of one or more codewords in the transmission on the reverse link meet a predetermined level of confidence; and
select a serving base station for a terminal for the reverse link based on one or more of the received feedback metrics.

* * * * *